US012200848B2

(12) United States Patent
Cho et al.

(10) Patent No.: US 12,200,848 B2
(45) Date of Patent: Jan. 14, 2025

(54) INDUCTION HEATING TYPE COOKTOP WITH OUTPUT CONTROL ALGORITHM BASED ON TEMPERATURE OF MULTIPLE COMPONENTS

(71) Applicant: LG Electronics Inc., Seoul (KR)

(72) Inventors: Chuhyoung Cho, Seoul (KR); Seongho Son, Seoul (KR); Younghwan Kwack, Seoul (KR); Seonho Jeon, Seoul (KR); Jongseong Ji, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/501,911

(22) Filed: Nov. 3, 2023

(65) Prior Publication Data

US 2024/0064878 A1 Feb. 22, 2024

Related U.S. Application Data

(63) Continuation of application No. 17/027,071, filed on Sep. 21, 2020, now Pat. No. 11,849,525.

(30) Foreign Application Priority Data

Apr. 2, 2020 (KR) ........................ 10-2020-0040239

(51) Int. Cl.
*H05B 6/12* (2006.01)
*H05B 6/06* (2006.01)

(52) U.S. Cl.
CPC ........... *H05B 6/1272* (2013.01); *H05B 6/065* (2013.01)

(58) Field of Classification Search
CPC ............ H05B 6/04; H05B 6/06; H05B 6/062; H05B 6/065; H05B 6/105; H05B 6/1209;
(Continued)

(56) References Cited

U.S. PATENT DOCUMENTS

| | | | |
|---|---|---|---|
| 6,633,023 B2 | 10/2003 | Cornec et al. |
| 6,770,857 B2 | 8/2004 | Hirota et al. |

(Continued)

FOREIGN PATENT DOCUMENTS

| | | |
|---|---|---|
| EP | 1437920 | 7/2004 |
| EP | 1487239 | 12/2004 |

(Continued)

OTHER PUBLICATIONS

Extended European Search Report in European Appln. No. 21153658.6, dated Jul. 5, 2021, 7 pages.

(Continued)

*Primary Examiner* — Hung D Nguyen
(74) *Attorney, Agent, or Firm* — Fish & Richardson P.C.

(57) ABSTRACT

An induction heating type cooktop includes a case, an upper plate coupled to a top of the case and configured to support an object, a working coil disposed inside the case and configured to heat the object, a thin film arranged at a top surface of the upper plate or a bottom surface of the upper plate, at least one temperature sensor configured to measure a temperature of at least one of components of the induction heating type cooktop, the components including the thin film, and a microcontroller unit (MCU) configured to drive the working coil and to control an output of the working coil based on whether the temperature satisfies at least one condition that is preset for the at least one of the components.

20 Claims, 17 Drawing Sheets

(58) Field of Classification Search

CPC ................ H05B 6/1236; H05B 6/1245; H05B 6/1254; H05B 6/1263; H05B 6/1272; H05B 6/128; H05B 2213/05; H05B 2213/07

See application file for complete search history.

(56) References Cited

U.S. PATENT DOCUMENTS

| | | | |
|---|---|---|---|
| 7,081,603 | B2 | 7/2006 | Hoh et al. |
| 2005/0205561 | A1 | 9/2005 | Keishima et al. |
| 2018/0376543 | A1 | 12/2018 | Kang et al. |

FOREIGN PATENT DOCUMENTS

| | | |
|---|---|---|
| EP | 1536669 | 6/2005 |
| EP | 3270660 | 1/2018 |
| EP | 3618569 | 3/2020 |
| JP | 2002-056959 | 2/2002 |
| JP | 3496558 | 2/2004 |
| JP | 2008-311058 | 12/2008 |
| JP | 5630495 | 11/2014 |

OTHER PUBLICATIONS

Office Action in European Appln. No. 21153658.6, mailed on Oct. 27, 2023, 3 pages.

INDUCTION HEATING TYPE COOKTOP WITH OUTPUT CONTROL ALGORITHM BASED ON TEMPERATURE OF MULTIPLE COMPONENTS

CROSS-REFERENCE TO RELATED APPLICATION

This application is a continuation of U.S. application Ser. No. 17/027,071, filed on Sep. 21, 2020, which claims the benefit of Korean Patent Application No. 10-2020-0040239, filed on Apr. 2, 2020, the disclosures of which are incorporated herein in their entirety by reference.

TECHNICAL FIELD

The present disclosure relates to a method for controlling an output of a cooktop by combining temperature measurements of various components included in the cooktop.

BACKGROUND

Various types of cooking devices may be used to cook food at home or at restaurants. For example, gas ranges may use gas as fuel to heat food. In some cases, cooking devices may heat a target heating object such as a pot and a cooking vessel using electricity rather than gas.

In some examples, methods for heating a target heating object using electricity may be divided into a resistance heating method and an induction heating method. In the electric resistance heating method, a target heating object may be heated by heat that is generated when a current flows in a metal resistance wire or a non-metallic heating element such as Silicon Carbide (SiC) and transferred to the target heating object (e.g., a cooking vessel) through heat dissipation or heat transfer. In the induction heating method, a target heating object may be heated by an eddy current generated in the target heating object made of a metal material using an electrical field that is generated around a coil when a high frequency power having a predetermined magnitude is applied to the coil.

The induction heating method may be applied to cooktops.

In some cases, a cooktop using an induction heating method may only heat an object made of a magnetic material. That is, when an object made of a nonmagnetic material (for example, heat-resistant glass, porcelain, etc.) is disposed on the cooktop, the cooktop may not heat the nonmagnetic material object.

In some cases, an induction heating device may include a heating plate disposed between a cooktop and a nonmagnetic object to heat the object. In some cases, a method of implementing induction heating by adding the heating plate may have a low heating efficiency due to the heating plate, and a cooking time to heat ingredients contained in the target heating object may be increased.

In some cases, a hybrid cooktop may heat a nonmagnetic object through a radiant heater using an electric resistance heating method, where a magnetic object is heated through a working coil by induction. In some cases, the hybrid cooktop may have a low output of the radiant heater, and a heating efficiency may be low. A user may feel inconvenience in considering a material of a target heating object when placing the target heating object in the heating area.

In some cases, an all metal cooktop may heat a metal object (e.g., a nonmagnetic metal and a magnetic object.

However, the all metal cooktop may not heat a nonmagnetic and non-metallic object. In addition, a heating efficiency may be lower than a radiant heater technology, and a material cost may be high.

In some cases, a cooktop may further include a thin layer (thin layer or thin film), which is a separate component that may be induction heated. Thus, it may be possible to heat a container made of a magnetic material by induction and a container incapable of being directly induction heated using heat conducted from a thin film that is separately induction heated. In some cases, a container incapable of being induction heated may be inefficient in heat transfer compared to the container capable of being directly induction heated. For this reason, a temperature of a thin film to be induction heated may be heated to a relatively higher temperature (for example, 600° C.) than a temperature of the container to be directly induction heated.

In some cases, where a cooktop has a thin film capable of being induction heated, if the cooktop is heated to about 600° C. or higher based on the induction heating of the thin film, the temperature may increase at a very high rate. In some cases, the high output of the cooktop may damage components of the cooktop.

SUMMARY

The present disclosure describes an induction heating type cooktop capable of heating both a magnetic object and a nonmagnetic object.

The present disclosure further describes a cooktop including a thin film capable of being directly heated through induction heating, control an output of the cooktop by combining temperature measurements of various components including the thin film that is heated to a high temperature.

Objects of the present disclosure are not limited thereto, and other objects and advantages of the present disclosure will be understood by the following description, and will become more apparent from implementations of the present disclosure. Furthermore, the objects, features and advantages of the present disclosure may be realized by means disclosed in the accompanying claims or combination thereof.

According to one aspect of the subject matter described in this application, an induction heating type cooktop includes a case, an upper plate coupled to a top of the case and configured to support an object, a working coil disposed inside the case and configured to heat the object, a thin film arranged at least one of a top surface of the upper plate or a bottom surface of the upper plate, at least one temperature sensor configured to measure a temperature of at least one of components of the induction heating type cooktop, the components including the thin film, and a microcontroller unit (MCU) configured to drive the working coil and to control an output of the working coil based on whether the temperature satisfies at least one condition that is preset for the at least one of the components.

Implementations according to this aspect may include one or more of the following features. For example, the at least one temperature sensor may include a thermocouple configured to measure a temperature of the thin film. In some examples, the at least one temperature sensor may be configured to measure a first temperature of the thin film and a second temperature of at least one of the working coil, the upper plate, or an insulated gate bipolar transistor (IGBT).

In some implementations, the components may include a first component group including one or more of the components, and the MCU may be configured to determine whether a component temperature of the one or more of the components is greater than or equal to a preset temperature, and to reduce the output of the working coil based on a determination that the component temperature is greater than or equal to the preset temperature. In some examples, the MCU may be configured to increase or maintain the output of the working coil based on a determination that the component temperature is less than the preset temperature.

In some examples, the MCU may be configured to, based on the output of the working coil being less than a target output set by a user, increase the output of the working coil, and based on the output of the working coil being equal to the target output, maintain the output of the working coil. In some implementations, the MCU may be configured to determine an output reduction degree of the working coil corresponding to the component having the component temperature greater than or equal to the preset temperature.

In some implementations, the components may include a second component group including the thin film, and the MCU is configured to determine a current temperature or a temperature increase rate corresponding to the second component group, and to control the output of the working coil based on at least one of the current temperature or the temperature increase rate corresponding to the second component group. In some examples, the MCU may be configured to increase an output reduction degree of the working coil based on an increase of at least one of the current temperature or the temperature increase rate. In some examples, the MCU may be configured to, based on the current temperature being greater than or equal to a predetermined threshold temperature, control the output of the working coil based on at least one of the current temperature or the temperature increase rate.

In some implementations, the MCU may be configured to compare output reduction degrees corresponding to the respective components of the induction heating type cooktop, and to control the output of the working coil based on the comparison of the output reduction degrees. In some examples, the MCU may be configured to reduce the output of the working coil with a maximum output reduction degree among the output reduction degrees.

In some implementations, a thickness of the thin film is less than a skin depth of the thin film.

According to another aspect, a method controls an induction heating type cooktop including a case, an upper plate coupled to a top of the case and configured to support an object, a working coil disposed inside the case and configured to heat the object, a thin film arranged at least one of a top surface of the upper plate or a bottom surface of the upper plate, at least one temperature sensor, and a microcontroller unit (MCU) configured to drive the working coil. The method includes measuring a temperature of at least one of components of the induction heating type cooktop, determining whether the temperature satisfies at least one condition that is preset for the at least one of the components, and controlling an output of the working coil based on whether the temperature satisfies the at least one condition.

Implementations according to this aspect may include one or more of the following features or the features of the cooktop described above. For example, measuring the temperature may include measuring a first temperature of the thin film by a thermocouple and a second temperature of at least one of the working coil, the upper plate, or an insulated gate bipolar transistor (IGBT) of the induction heating type cooktop. In some examples, determining whether the temperature satisfies the at least one condition may include determining whether a component temperature of one or more of the components is greater than or equal to a preset temperature, and controlling the output of the working coil may include reducing the output of the working coil based on a determination that the component temperature is greater than or equal to the preset temperature.

In some implementations, controlling the output of the working coil further may include increasing or maintaining the output of the working coil based on a determination that the component temperature is less than the preset temperature. In some examples, the method may further include determining an output reduction degree of the working coil corresponding to the component having the component temperature greater than or equal to the preset temperature. In some examples, controlling the output of the working coil may include increasing an output reduction degree of the working coil based on an increase of at least one of the temperature of the at least one of the components or a temperature increase rate set for the at least one of the components.

In some implementations, the method may include comparing output reduction degrees corresponding to the respective components of the induction heating type cooktop. Controlling the output of the working coil may include controlling the output of the working coil based on the temperature of the at least one of the components and one of the output reduction degrees corresponding to the at least one of the components, and reducing the output of the working coil with a maximum output reduction degree among the output reduction degrees.

BRIEF DESCRIPTION OF THE DRAWINGS

The above and other aspects, features, and advantages of certain implementations will be more apparent from the following detailed description taken in conjunction with the accompanying drawings.

DETAILED DESCRIPTION

Hereinafter, one or more implementations of the present disclosure will be described in detail with reference to the drawings so that those skilled in the art to which the present disclosure pertains may easily perform the present disclosure. The present disclosure may be implemented in many different forms and is not limited to the examples described herein.

In implementing the present disclosure, for convenience of explanation, components may be described by being subdivided; however, these components may be implemented in a device or a module, or a single component may be implemented by being divided into a plurality of devices or modules.

Hereinafter, one or more implementations of an induction heating type cooktop will be described.

Figure 1:
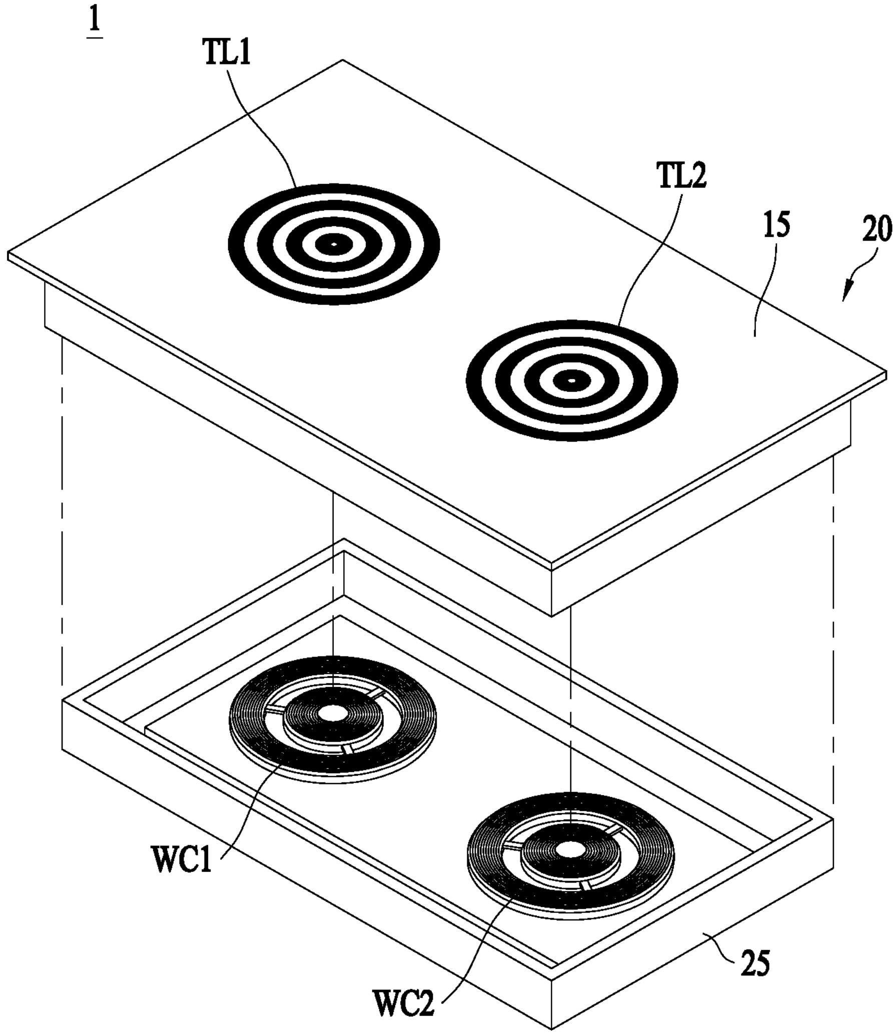
FIG. 1 is a diagram illustrating an example of an induction heating type cooktop.

FIG. 1 is a diagram illustrating an example of an induction heating type cooktop. Referring to FIG. 1, an induction heating type cooktop 10 may include a case 25, a cover plate 20, working coils WC1 and WC2 (that is, first and second working coils), and thin films TL1 and TL2 (that is, first and second thin films).

The working coils WC1 and WC2 may be installed in the case 25.

In some implementations, a variety of devices related to driving of a working coil other than the working coils WC1 and WC2 may be installed in the case 25. For example, the devices relating to driving of a working coil may include a power part for providing alternating current power, a rectifying part for rectifying alternating current power from the power part to direct current power, an inverter part for inverting the direct power rectified by the rectifying part to a resonance current through a switching operation, a control part for controlling operations of various devices in the induction heating type cooktop 10, a relay or a semiconductor switch for turning on and off a working coil, and the like. Regarding this, a detailed description will be herein omitted.

The cover plate 20 may be coupled to a top of the case 25, and may include an upper plate 15 for placing a target object to be heated on the top.

For example, the cover plate 20 may include the upper plate 15 for placing a target object to be heated, such as a cooking vessel.

In some examples, the upper plate 15 may be made of a glass material (e.g., ceramic glass).

In some implementations, an input interface may be provided in the upper plate 15 to receive an input from a user and transfer the input to a control part that serves as an input interface. The input interface may be provided at a position other than the upper plate 15.

The input interface may be configured to allow a user to input a desired heat intensity or an operation time of the induction heating type cooktop 10. The input interface may be implemented in various forms, such as a mechanical button or a touch panel. The input interface may include, for example, a power button, a lock button, a power control button (+, −), a timer control button (+, −), a charging mode button, and the like. The input interface may transfer an input provided by a user to a control part for the input interface, and the control part for the input interface may transfer the input to the aforementioned control part (that is, a control part for an inverter). The aforementioned control part may control operations of various devices (e.g., a working coil) based on an input (that is, a user input) provided from the control part for the input interface, and a detailed description thereof will be omitted. In some examples, the control part may be a controller, a processor, or an electric circuit.

The upper plate 15 may visually display whether the working coils WC1 and WC2 are being driven or not and intensity of heating (that is, thermal power). For example, a fire hole shape may be displayed in the upper plate 15 by an indicator that includes a plurality of light emitting devices (e.g., light emitting diodes (LEDs)) provided in the case 25.

The working coils WC1 and WC2 may be installed inside the case 25 to heat a target heating object.

Specifically, driving of the working coils WC1 and WC2 may be controlled by the aforementioned control part. When the target heating object is positioned on the upper plate 15, the working coils WC1 and WC2 may be driven by the control part.

In some implementations, the working coils WC1 and WC2 may directly heat a magnetic target heating object (that is, a magnetic object) and may indirectly heat a nonmagnetic target heating object (that is, a nonmagnetic object) through the thin films TL1 and TL2 which will be described in the following.

The working coils WC1 and WC2 may heat a target heating object by employing an induction heating method and may be provided to overlap the thin films TL1 and TL2 in a longitudinal direction (that is, a vertical direction or an up-down direction).

Although FIG. 1 illustrates that two working coils WC1 and WC2 are installed in the case 25, but aspects of the present disclosure are not limited thereto. For instance, one working coil or three or more working coils may be installed in the case 25. Yet, for convenience of explanation, an example in which two working coils WC1 and WC2 are installed in the case 25 will be described.

The thin films TL1 and TL2 may be coated on the upper plate 15 to heat a nonmagnetic object among target heating objects.

Specifically, the thin films TL1 and TL2 may be coated on at least one of a top surface and a bottom surface of the upper plate 15 and may be provided to overlap the working coils WC1 and WC2 in a longitudinal direction (that is, a vertical direction or an up-down direction). Accordingly, it may be possible to heat the corresponding target heating object, regardless of a position and a type of the target heating object.

The thin films TL1 and TL2 may have at least one of a magnetic property and a nonmagnetic property (that is, either or both of the magnetic property and the nonmagnetic property).

In addition, the thin films TL1 and TL2 may be made of, for example, a conductive material, such as an aluminum, and may be coated on an upper surface of the upper plate 15 in the shape in which a plurality of rings having different diameters is repeated, as shown in the drawing. However, the present disclosure is not limited thereto.

That is, the thin films TL1 and TL2 may include a material other than a conductive material and may be coated on the upper plate 15 by taking a different form. Hereinafter, for convenience of explanation, an example in which the thin films TL1 and TL2 is made of a conductive material and coated on the upper plate 15 in the form of a plurality of rings having different diameters will be described.

In some implementations, two thin films TL1 and TL2 are provided as illustrated in FIG. 1, but the present disclosure is not limited thereto. That is, one thin film or three or more thin films may be coated. However, for convenience of explanation, one implementation in which the two thin films TL1 and TL2 are coated is described as an example.

FIG. 1 is a diagram illustrating an exemplary dispositional relationship between elements used in the present disclosure. Therefore, shapes, numbers, and positions of the elements should not be construed as being limited to the example shown in FIG. 2.

The thin films TL1 and TL2 will be described later in more detail.

Figure 2:
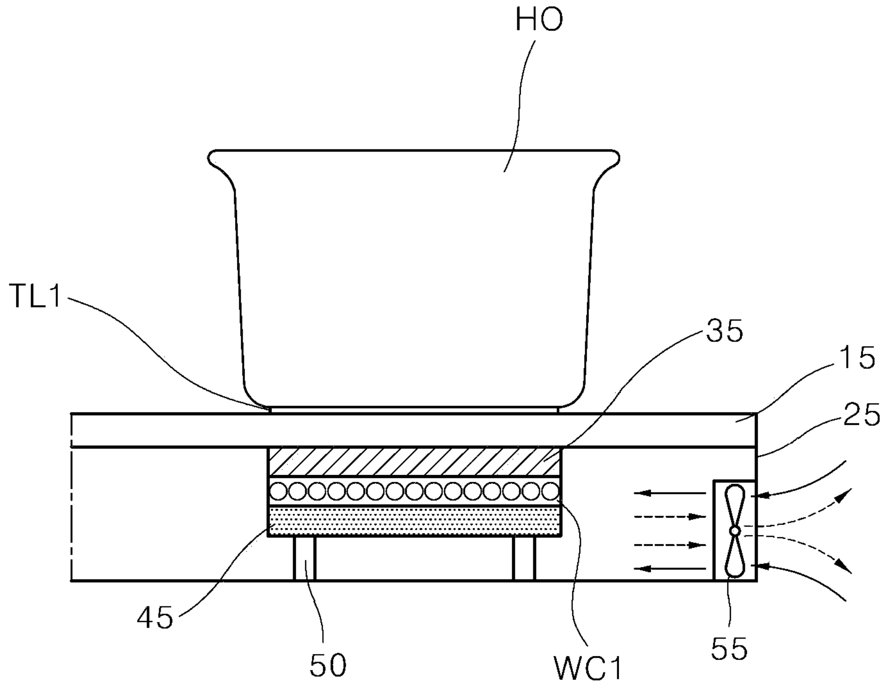
FIG. 2 is a diagram illustrating example elements disposed in an example of a case of the induction heating type cooktop shown in FIG. 1.

FIG. 2 is a diagram illustrating example elements provided inside a case of the induction heating type cooktop shown in FIG. 1.

Referring to FIG. 2, the induction heating type cooktop 10 may further include an insulator 35, a shield plate 45, a support member 50, and a cooling fan 55.

Since elements disposed in the surroundings of a first working coil WC1 are identical to elements disposed in the surroundings of a second working coil WC2 (the working coil in FIG. 1), the elements (e.g., the first thin film TL1, the insulator 35, the shield plate 45, the support member 50, and the cooling fan 55) in the surroundings of the first working coil WC1 will be hereinafter described for convenience of explanation.

The insulator 35 may be provided between a bottom surface of the upper plate 15 and the first working coil WC1.

Specifically, the insulator 35 may be mounted to the cover plate 20, that is, the bottom of the upper plate 15. The first working coil WC1 may be disposed below the insulator 35.

The insulator 35 may block heat, which is generated when the first thin film TL1 or a target heating object HO is heated upon driving of the first working coil WC1, from being transferred to the first working coil WC1.

That is, when the first thin film TL1 or the target heating object HO is heated by electromagnetic induction of the first working coil WC1, heat of the first thin film TL1 or the target heating object HO may be transferred to the upper plate 15 and the heat transferred to the upper plate 15 may be transferred to the first working coil WC1, thereby possibly causing damage to the first working coil WC1.

By blocking the heat from being transferred to the first working coil WC1, the insulator 35 may prevent or reduce damage of the first working coil WC1 caused by the heat and furthermore prevent or reduce degradation of heating performance of the first working coil WC1.

A spacer, which is not an essential constituent element, may be installed between the first working coil WC1 and the insulator 35.

Specifically, the spacer may be inserted between the first working coil WC1 and the insulator 35, so that the first working coil WC1 and the insulator 35 do not directly contact each other. Accordingly, the spacer may block heat, which is generated when the first thin film TL1 and the target heating object HO are heated upon driving of the first working coil WC1, from being transferred to the first working coil WC1 through the insulator 35.

That is, since the spacer may share the role of the insulator 35, it may be possible to minimize a thickness of the insulator 35 and accordingly minimize a gap between the target heating object HO and the first working coil WC1.

In addition, a plurality of spacers may be provided, and the plurality of spaces may be disposed to be spaced apart from each other in the gap between the first working coil WC1 and the insulator 35. Accordingly, air suctioned into the case 25 by the cooling fan 55 may be guided to the first working coil WC1 by the spacer.

That is, the spacer may guide air, introduced into the case 25 by the cooling fan 55, to be properly transferred to the first working coil WC1, thereby improving cooling efficiency of the first working coil WC1.

The shield plate 45 may be mounted to a bottom of the first working coil WC1 to block a magnetic field occurring downwardly upon driving of the first working coil WC1.

Specifically, the shield plate 45 may block the magnetic field occurring downwardly upon driving of the first working coil WC1 and may be supported upwardly by the support member 50.

The support member 50 may be installed between a bottom surface of the shield plate 45 and a bottom surface of the case 25 to support the shield plate 45 upwardly.

Specifically, by supporting the shield plate 45 upwardly, the support member 50 may indirectly support the insulator 35 and the first working coil WC1 upwardly. In doing so, the insulator 35 may be brought into tight contact with the upper plate 15.

As a result, it may be possible to maintain a constant gap between the first working coil WC1 and the target heating object HO.

The support member 50 may include, for example, an elastic object (e.g., a spring) to support the shield plate 45 upwardly, but aspects of the present disclosure are not limited thereto. In addition, the support member 50 is not an essential element and thus it may be omitted from the induction heating type cooktop 10.

The cooling fan 55 may be installed inside the case 25 to cool the first working coil WC1.

Specifically, driving of the cooling fan 55 may be controlled by the aforementioned control part and the cooling fan 55 may be installed at a side wall of the case 25. The cooling fan 55 may be installed at a position other than the side wall of the case 25. In an implementation, for convenience of explanation, an example in which the cooling fan 55 is installed at the side wall of the case 25 will be described.

The cooling fan 55 may suction outdoor air from the outside of the case 25, as shown in FIG. 2, and transfer the suctioned air to the first working coil WC1. The cooling fan 55 may suction indoor air (e.g., heated air) of the case 25 and discharge the suctioned air to the outside of the case 25.

In doing so, it may be possible to efficiently cool internal elements (e.g., first working coil WC1) of the case 25.

In some examples, the outdoor air transferred from the outside of the case 25 to the first working coil WC1 by the cooling fan may be guided to the first working coil WC1 by the spacer. Accordingly, it may be possible to directly and efficiently cool the first working coil WC1, thereby improving endurance of the first working coil WC1. That is, it may be possible to improve the endurance by preventing or reducing thermal damage.

In some examples, the induction heating type cooktop 10 may include one or more of the above-described features and configurations. Hereinafter, features and configurations of the aforementioned thin film will be described in more detail with reference to FIGS. 3 to 6.

Figure 3:
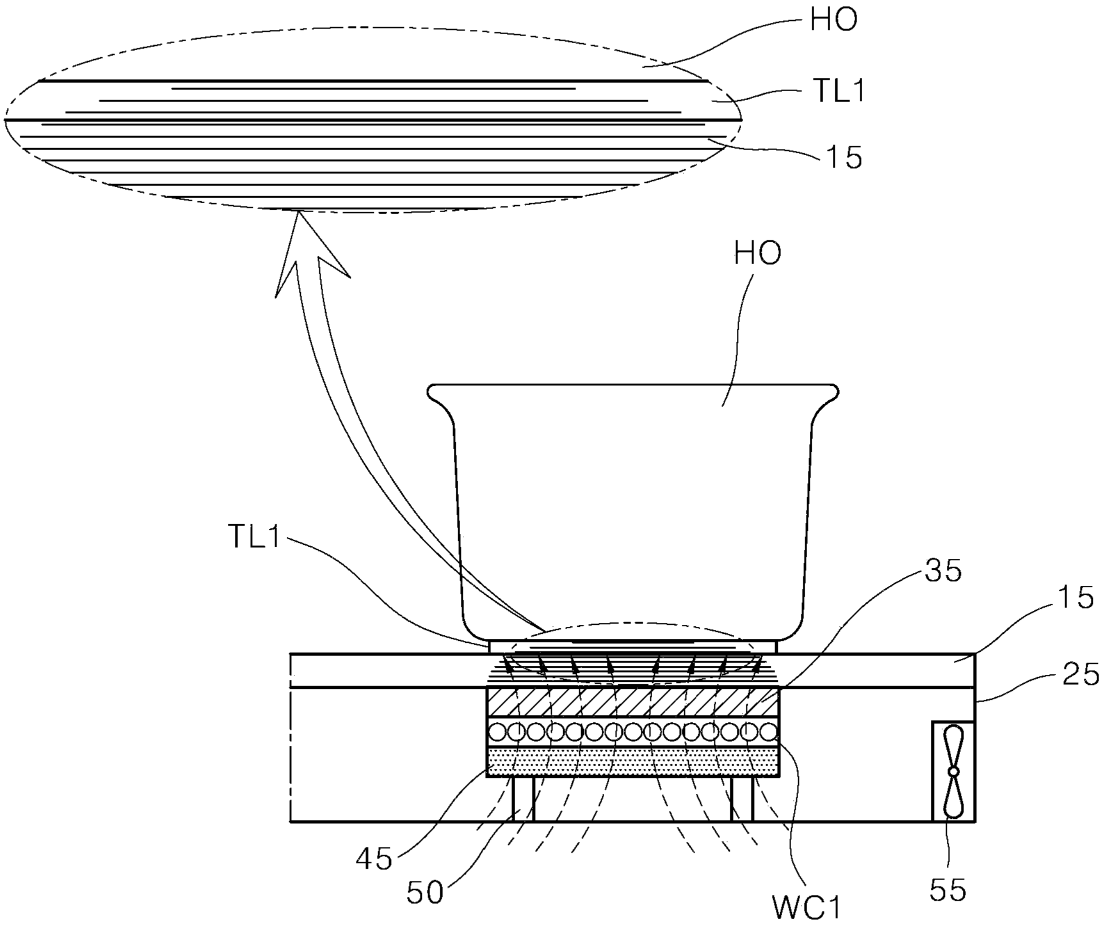
FIGS. 3 and 4 are diagrams illustrating examples of a thickness of a thin film and a skin depth of the thin film of an induction heating type cooktop.
Figure 4:
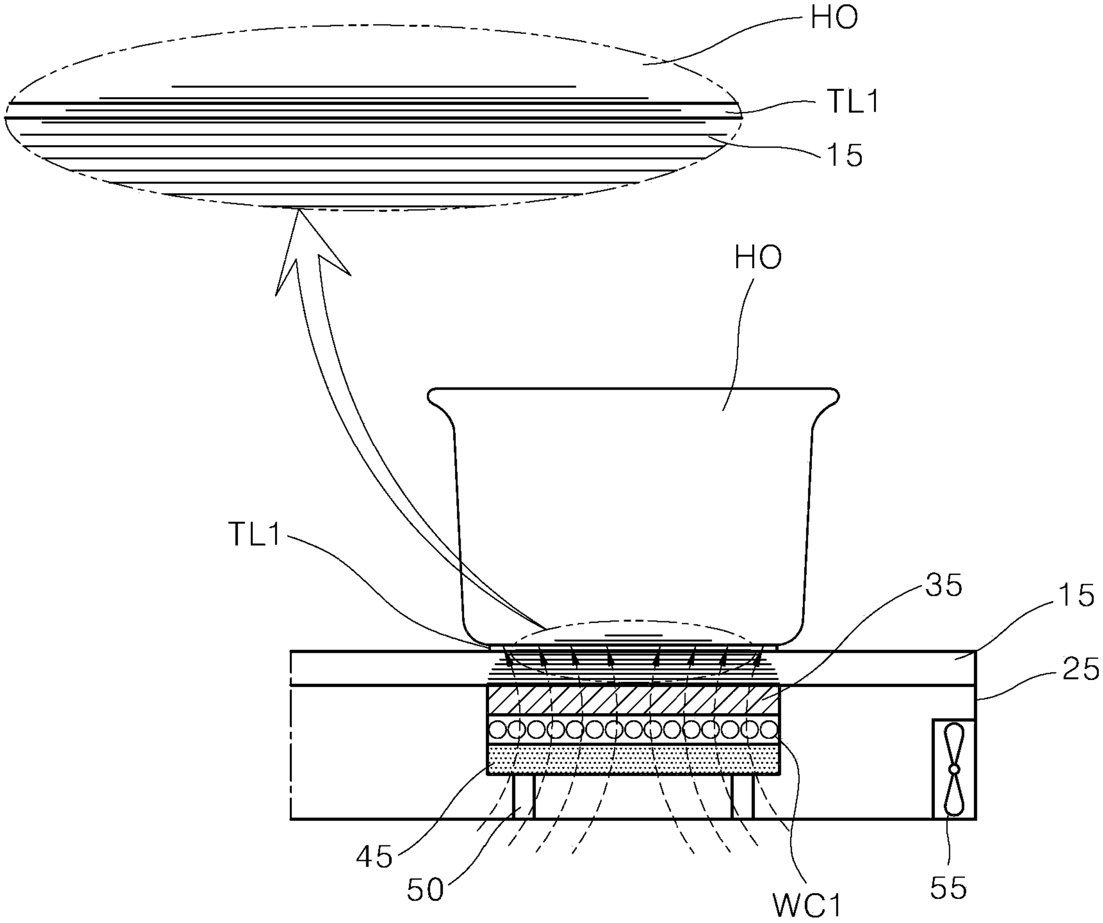
Figure 5:
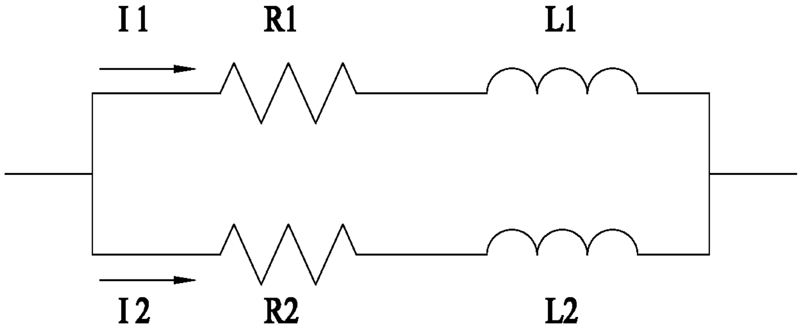
FIGS. 5 and 6 are diagrams illustrating examples of equivalent circuits defining an electric impedance between a thin film and a target heating object depending on a type of the target heating object.
Figure 6:
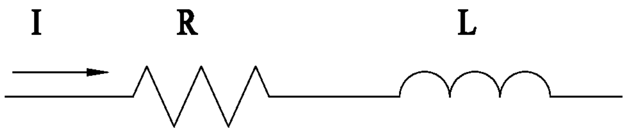

FIGS. 3 and 4 are diagrams illustrating a relation between a thickness and a skin depth of a thin film. FIGS. 5 and 6 are diagrams illustrating a variation of impedance between a thin film and a target heating object depending on a type of the target heating object.

The first thin film TL1 and the second thin film TL2 have the same technical features, and the thin film TL1 and TL2 may be coated on the top surface or the bottom surface of the upper plate 15. Hereinafter, for convenience of explanation, the first thin film TL1 coated on the top surface of the upper plate 15 will be described as an example.

The first thin film TL1 has the following features.

In some implementations, the first thin film TL1 may include a material having a low relative permeability.

For example, since the first thin film TL1 has a low relative permeability, the skin depth of the first thin film TL1 may be deep. The skin depth may refer to a depth by which a current may penetrate a material surface, and the relative permeability may be disproportional to the skin depth. Accordingly, the lower the relative permeability of the first thin film TL1, the deeper the skin depth of the first thin film TL1.

In some examples, the skin depth of the first thin film TL1 may have a value greater than a value corresponding to a thickness of the first thin film TL1. That is, since the first thin film TL1 has a thin thickness (e.g., a thickness of 0.1 μm~1,000 μm) and a skin depth of the first thin film TL1 is greater than the thickness of the first thin film TL1, a magnetic field occurring by the first working coil WC1 may pass through the first thin film TL1 and be then transferred to the target heating object HO. As a result, an eddy current may be induced to the target heating object HO.

That is, as illustrated in FIG. 3, when the skin depth of the first thin film TL1 is narrower than the thickness of the first thin film TL1, it is difficult for the magnetic field occurring by the first working coil WC1 to reach the target heating object HO.

In some implementations, as illustrated in FIG. 4, when the skin depth of the first skin depth TL1 is deeper than the thickness of the first thin film TL1, most of the magnetic field generated by the first working coil WC1 may be transferred to the target heating object HO. That is, since the skin depth of the first thin film TL1 is deeper than the thickness of the first thin film TL1, the magnetic field generated by the first working coil WC1 may pass through the first thin film TL1 and most of the magnetic field energy may be dissipated in the target heating object HO. In doing so, the target heating object HO may be heated primarily.

Since the first thin film TL1 has a thin thickness as described above, the thin film TL1 may have a resistance value that allows the first thin film TL1 to be heated by the first working coil WC1.

Specifically, the thickness of the first thin film TL1 may be disproportional to the resistance value of the first thin film TL1 (that is, a sheet resistance value). That is, the thinner the thickness of the first thin film TL1 coated on the upper plate 15, the greater the resistance value (that is, the sheet resistance) of the first thin film TL1. As thinly coated on the upper plate 15, the first thin film TL1 may change in property to a load resistance at which heating may be possible.

The first thin film TL1 may have a thickness of, for example, 0.1 μm to 1,000 μm, but not limited thereto.

The first thin film TL1 having the above-described characteristic is present to heat a nonmagnetic object, and thus, an impedance property between the first thin film TL1 and the target heating object HO may vary according to whether the target heating object HO positioned on the top of the upper plate 15 is a magnetic object or a nonmagnetic object.

One or more examples, where the target heating object is a magnetic object, will be described in the following.

Referring to FIGS. 2 and 5, when the first working coil WC1 is driven while a magnetic target heating object HO is positioned on the top of the upper plate 15, a resistance component R1 and an inductor component L1 of the magnetic target heating object HO may form an equivalent circuit to that of a resistance component R2 and an inductor component L2 of the first thin film TL1.

In this case, in the equivalent circuit, an impedance (that is, an impedance of R1 and L1) of the magnetic target heating object HO may be smaller than an impedance (that is, an impedance of R2 and L2) of the first thin film TL1.

Accordingly, when the aforementioned equivalent circuit is formed, the magnitude of an eddy current I1 applied to the magnetic target heating object HO may be greater than the magnitude of an eddy current I2 applied to the first thin film TL1. More specifically, most of eddy currents may be applied to the target heating object HO, thereby heating the target heating object HO.

That is, when the target heating object HO is a magnetic object, the aforementioned equivalent circuit may be formed and most of eddy currents may be applied to the target heating object HO. Accordingly, the first working coil WC1 may directly heat the target heating object HO.

Since some of eddy currents is applied even to the first thin film TL1, the first thin film TL1 may be heated slightly. Accordingly, the target heating object HO may be indirectly heated to a certain degree by the thin film TL1. However, a degree to which the target heating object HO is heated indirectly by the first thin film TL1 may not be considered significant, as compared with a degree to which the target heating object HO is heated directly by the first working coil WC1.

One or more examples, where a target heating object is a nonmagnetic object, will be described in the following.

Referring to FIGS. 2 and 6, when the working coil WC1 is driven while a nonmagnetic target heating object HO is positioned on the top of the upper plate 15, an impedance may not exist in the nonmagnetic target heating object HO but exists in the first thin film TL1. That is, a resistance component R and an inductor component L may exist only in the first thin film TL1.

Accordingly, an eddy current I may be applied only to the first thin film TL1 and may not be applied to the nonmagnetic target heating object HO. More specifically, the eddy current I may be applied only to the first thin film TL1, thereby heating the first thin film TL1.

That is, when the target heating object HO is a nonmagnetic object, the eddy current I may be applied to the first thin film TL1, thereby heating the first thin film TL1. Accordingly, the nonmagnetic target heating object HO may be indirectly heated by the first thin film TL1 that is heated by the first working coil WC1.

To put it briefly, regardless of whether the target heating object HO is a magnetic object or a nonmagnetic object, the target heating object HO may be heated directly or indirectly by a single heating source which is the first working coil WC1. That is, when the target heating object HO is a magnetic object, the first working coil WC1 may directly heat the target heating object HO, and, when the target heating object HO is a nonmagnetic object, the first thin film TL1 heated by the first working coil WC1 may indirectly heat the target heating object HO.

As described above, the induction heating type cooktop 10 may be capable of heating both a magnetic object and a nonmagnetic object. Thus, the induction heating type cooktop 10 may be capable of heating a target heating object regardless of a position and a type of the target heating object. Accordingly, without determining whether the target heating object is a magnetic object or a nonmagnetic object, a user is allowed to place the target heating object in any heating region on the top plate, and therefore, convenience of use may improve.

In some examples, the induction heating type cooktop 10 may directly or indirectly heat a target heating object using the same heating source, and therefore, a heat plate or a radiant heater may not be included in the induction heating type cooktop 10. Accordingly, it may be possible to increase heating efficiency and cut down a material cost.

Hereinafter, an induction heating type cooktop will be described.

Figure 7:
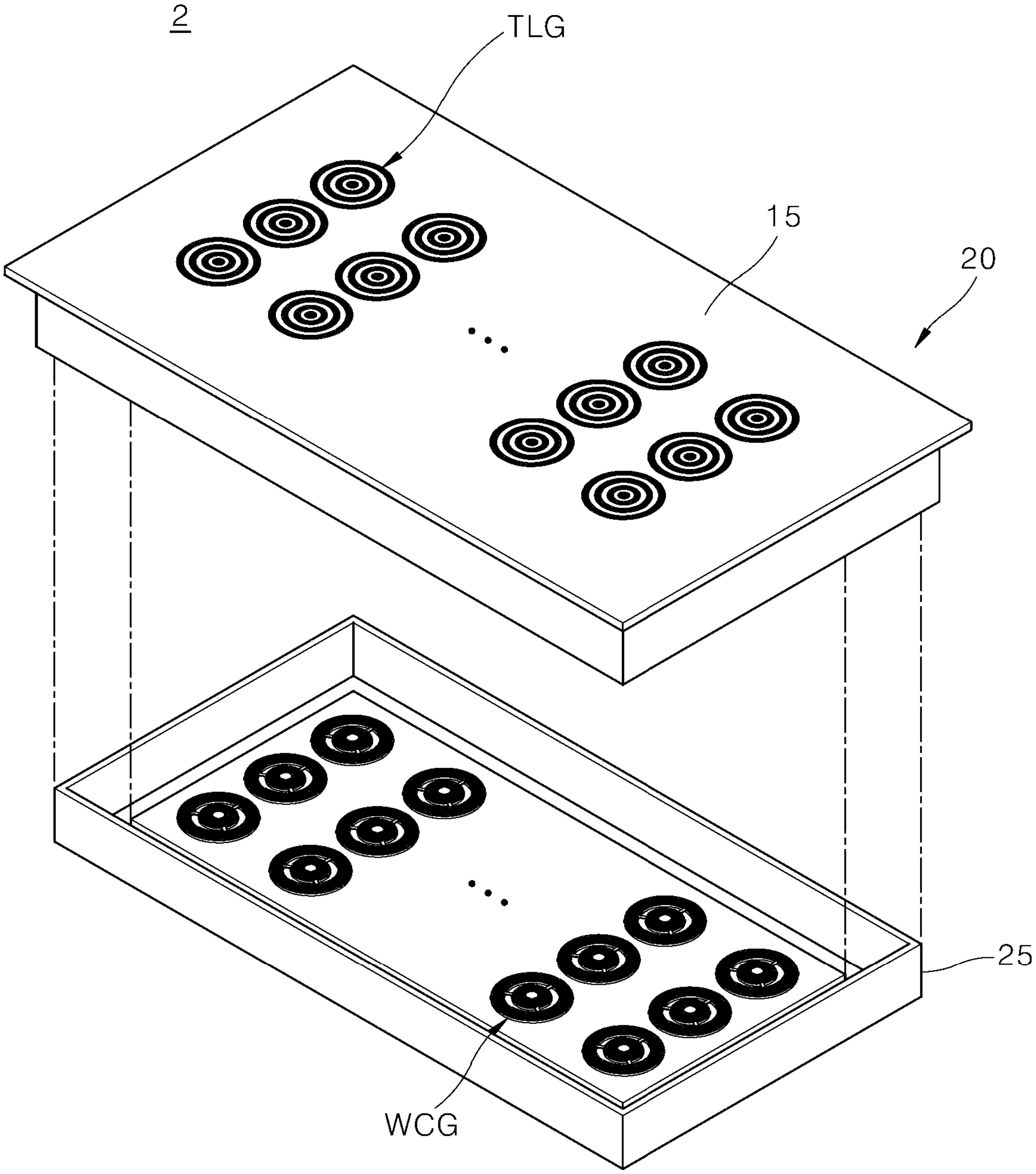
FIG. 7 is a diagram illustrating an example of an induction heating type cooktop.
Figure 8:
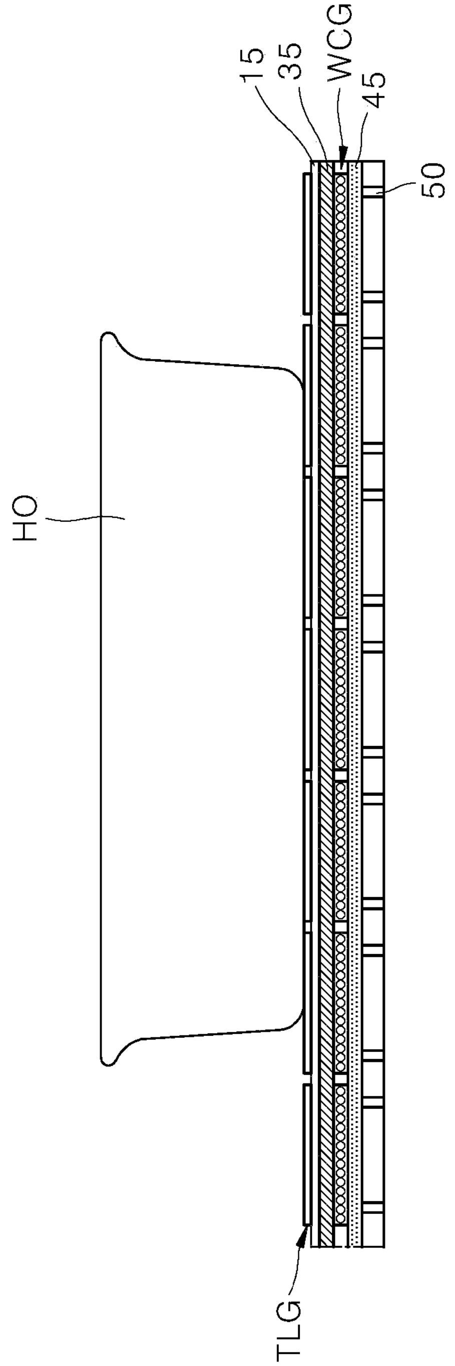
FIG. 8 is a diagram illustrating example elements disposed in an example of a case of the induction heating type cooktop shown in FIG. 7.
Figure 9:
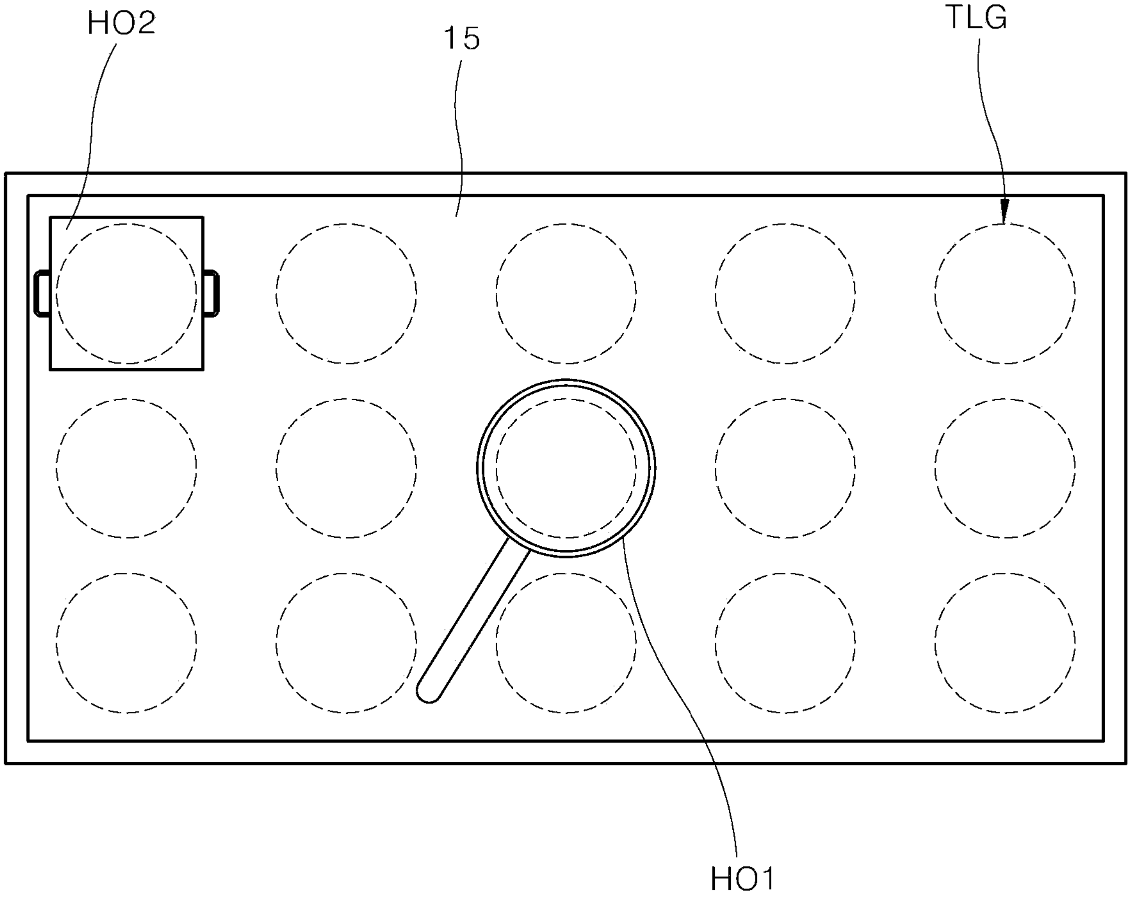
FIG. 9 is a diagram illustrating an example of a target heating object positioned on the induction heating type cooktop shown in FIG. 7.

FIG. 7 is a diagram illustrating an example of an induction heating type cooktop. FIG. 8 is a diagram illustrating example elements provided inside a case of the induction heating type cooktop shown in FIG. 7. FIG. 9 is a diagram illustrating an example of a target heating object positioned at the induction heating type cooktop shown in FIG. 7.

An induction heating type cooktop 2 is identical to the induction heating type cooktop 10 shown in FIG. 1, except for some elements and effects. Hence, a difference compared to the induction heating type cooktop 10 will be focused and described.

Referring to FIGS. 8 and 9, the induction heating type cooktop 2 may be a zone-free cooktop.

Specifically, the induction heating type cooktop 2 may include a case 25, a cover plate 20, a plurality of thin films TLGs, an insulator 35, a plurality of working coils WCGs, a shield plate 45, a support member 50, a cooling fan, a spacer and a control part.

Here, the plurality of thin films TLGs and the plurality of WCGs may overlap in a traverse direction and may be disposed to correspond to each other in a one-to-one relationship. The plurality of thin films TLGs and the plurality of thin films WCGs may be in a many-to-many relationship rather than the one-to-one relationship. In some implementations, for example, the plurality of thin films TLGs and the plurality of working coils WCGs may be arranged in a one-to-one relationship.

For instance, the induction heating type cooktop 2 may be a zone-free cooktop including the plurality of thin films TLGs and the plurality of working coils WCGs, and therefore, it may be possible to heat a single target heating object HO by using some or all of the plurality of working coils WCGs at the same time or by using some or all of the plurality of thin films TLGs at the same time. In some examples, it may be possible to heat the target heating object HO by using both some or all of the plurality of working coils WCG and some or all of the plurality of thin films TLGs.

Accordingly, as shown in FIG. 9, in a region where the plurality of working coils WCG (see FIG. 8) and the plurality of thin films TLG are present (e.g., a region of the upper plate 15), it may be possible to heat target heating objects HO1 and HO2, regardless of sizes, positions, and types of the target heating objects HO1 and HO2.

Figure 10:
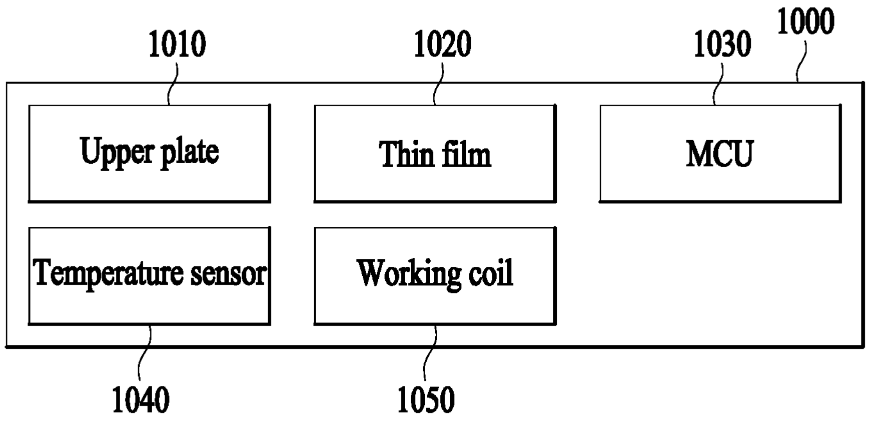
FIG. 10 is a block diagram illustrating example components included in an induction heating cooktop configured to control an output based on a component temperature.

In some implementations, a thin film may be heated by an induction heating method, and a container (that is, a target heating object HO) disposed at the upper plate 15 is made of a non-magnetic material. Thus, when an induction heated thin film TL is used as the main source of heating to heat the target heating object HO, the thin film TL has a sufficient thickness to secure sufficient inverter control performance. In addition, the heating of the target heating object HO by the induction heated thin film TL is due to heat transfer from the thin film TL. Thus, the wider the area where the thin film TL and the target heating object HO contact each other, the higher efficiency of the target heating object HO. Referring to FIG. 10, heat may be more efficiently conducted from a thin film to a target heating object HO in a thin film shape having a large area, compared to thin film shapes each having a smaller area than that of the thin film shape having the large area.

In some cases, where the target heating object HO is made of a magnetic material and capable of being directly induction heated, if a thin film TL is in the thin film shape having a large area, the thin film TL may be at a higher proportion to be induction heated and therefore a temperature increase rate of the thin film TL may increase. When it is detected that a temperature of the thin film TL is heated to or above the limit temperature, the output of the working coil WC may be reduced to maintain stability. If a target heating object HO made of a magnetic material is heated, the temperature of the thin film TL may reach the limit temperature rapidly and hence a process for reducing the output of the working coil WC may be performed.

In some examples, the heating efficiency of the target heating object HO made of a magnetic material may be undermined. In some examples, in order to improve the heating efficiency of the target heating object HO made of a magnetic material, the thin film TL may have a small area. For example, a small-area thin film shape may have a higher efficiency of the object made of a magnetic material than a large-area thin film shape. In the other words, in order to achieve both the heating efficiency of a target heating object HO made of a non-magnetic material and the heating efficiency of a target heating object HO made of a magnetic material, an appropriate width of the thin film TL should be determined. In some examples, a heating mechanism may be optimized for each material of a target heating object HO based on a shape and a pattern design of the thin film TL.

In some examples, a thin film shape for improving heating efficiency may have a shape in which a gap is formed between a plurality of thin films TL forming a closed loop, and accordingly, a heating area of a target heating object HO may be reduced. When the plurality of thin films TL forms the closed loop, the plurality of thin films TL may be coupled with a magnetic field from the working coil WC. Therefore, a large coupling force may be achieved using the plurality of thin films TL each having a narrow width and forming the closed loop. However, since the strength of the magnetic field is not uniform, heat of high temperature may occur in some of the plurality of thin films TL. In addition, as the heating area decreases, the size of a resistance component of an equivalent circuit decreases and the size of an inductance component increases. Further, the absence of heat conduction in a portion where a thin film TL is not present undermines the heating efficiency of a target heating object HO made of a non-magnetic material.

In some examples, a thin film shape for improving heating efficiency may have a shape in which a closed loop of a current induced in a thin film TL does not to include the central portion of the working coil WC may be used. This shape has a weak coupling force with a magnetic field. Thus, in the case where a thin film TL is formed in the aforementioned shape and a target heating object HO is made of a magnetic material, induction heating of the thin film TL may be induction heated to a degree relatively larger, compared to other thin film shapes. Accordingly, the heating efficiency of the target heating object HO made of the magnetic material may be relatively high for a heating area of the target heating object HO.

In some cases, the resistance component of the equivalent circuit formed by a thin film TL may have a small size, and the driving frequency of the working coil WC may tend to become relatively very low compared to the driving frequency of the target heating object HO made of a magnetic material. Accordingly, it may be difficult to perform an appropriate output control.

As such, the heating efficiency of a target heating object HO may be different according to a shape of a thin film TL. The present disclosure proposes an optimal shape of a thin film TL to provide a shape of the thin film TL for increasing the heating efficiency of a target heating object HO made of various materials.

FIG. 10 is a block diagram illustrating example components included in an induction heating cooktop 1000 configured to control an output based on a component temperature.

In some implementations, the cooktop 1000 may include an upper plate 1010 coupled to a top of a case and allowing an object HO to be placed at a top of the upper plate 1010, a working coil 1050 provided inside the case to heat the object HO, a thin film 1020 disposed at least one of the top and bottom of the upper plate 1010, at least one temperature sensor 1040 configured to measure a temperature of at least one component including the thin film 1020, and a microcontroller unit (MCU) 1030 configured to drive the working coil 1050 and control an output of the working coil 1050 based on whether the temperature measured by the at least one temperature sensor 1040 satisfies at least one condition. In some examples, the MCU 1030 may include an electric circuit, an integrated circuit, a controller, a processor, or the like.

Figure 11:
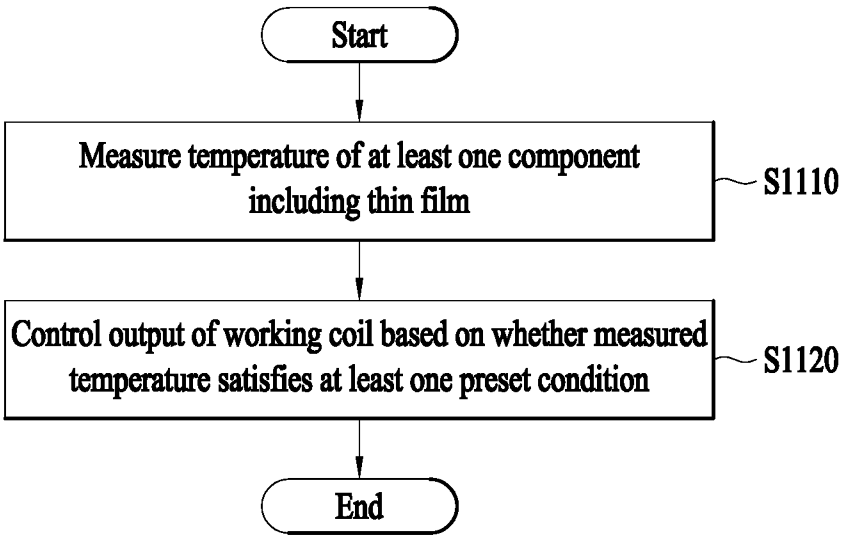
FIG. 11 is a flowchart illustrating an example of a method for controlling an output of a working coil based on whether a measured temperature of a component satisfies a preset condition.

FIG. 11 is a flowchart illustrating an example of a method of controlling an output of the working coil 1050 based on whether a measured temperature of a component satisfies a preset condition.

In some implementations, the cooktop 1000 may, in operation S1110 measure a temperature of at least one component including the thin film 1020 in operation S1110. In some implementations, the measured temperature may be used in various forms as information for the MCU 1030 to control the output of the working coil 1050.

In operation S1120, the cooktop 1000 may control the output of the working coil 1050 based on whether the temperature measured in operation S1110 satisfies at least one preset condition.

In some implementations, at least one condition may be preset for each of at least one component and may be a condition related to a temperature of a corresponding component. In some implementations, when a temperature of at least one component is measured by the temperature sensor 1040, the MCU 1030 may determine whether the measured temperature satisfies at least one condition preset for each component. For example, the MCU 1030 may divide possible component temperatures to be measured by the temperature sensor 1040 into a plurality of temperature sections and may determine which temperature section includes a measured temperature of each component to thereby determine whether a corresponding component satisfies at least one preset condition.

In some implementations, at least one condition may be preset for each component. For example, the MCU 1030 may divide possible component temperatures to be measured by the temperature sensor 1040 into a plurality of temperature sections and may determine which of the plurality of temperature sections includes a measured temperature of a corresponding component, and at least one temperature section which may include each measured temperature may be set differently for each component.

In some implementations, at least one type of the temperature sensor 1040 may be used according to a component whose temperature is to be measured. For example, a thermocouple may be used as a temperature sensor 1040 for measuring a temperature of the thin film 1020 heated to a relatively high temperature, and various conventional temperature sensors (e.g., a thermistor and the like) may be used as a temperature sensor 1040 for measuring a temperature of for other parts heated to a relatively low temperature. However, the type of the temperature sensor is not necessarily limited to the above examples, and various types of the temperature sensor may be used within a range obvious to those of ordinary skill in the art.

In some implementations, the temperature sensor 1040 for measuring a temperature of the thin film 1020 may be arranged to contact a portion to be induction heated to a highest temperature in the thin film 1020. In some implementations, a portion to be heated to the highest temperature in the thin film 1020 may vary according to a specific shape of the thin film 1020. For example, in a ring-shaped thin film 1020 or a disc-shaped thin film 1020 including a hollow portion, the temperature sensor 1040 may be arranged at a central portion (that is, the middle between the outer peripheral portion and the inner peripheral portion (or the center of a disc-shaped thin film)) based on a radial direction of the thin film 1020, so that the temperature sensor 1040 may measure a portion to be heated to a predetermined temperature or higher in the thin film 1020.

Figure 12:
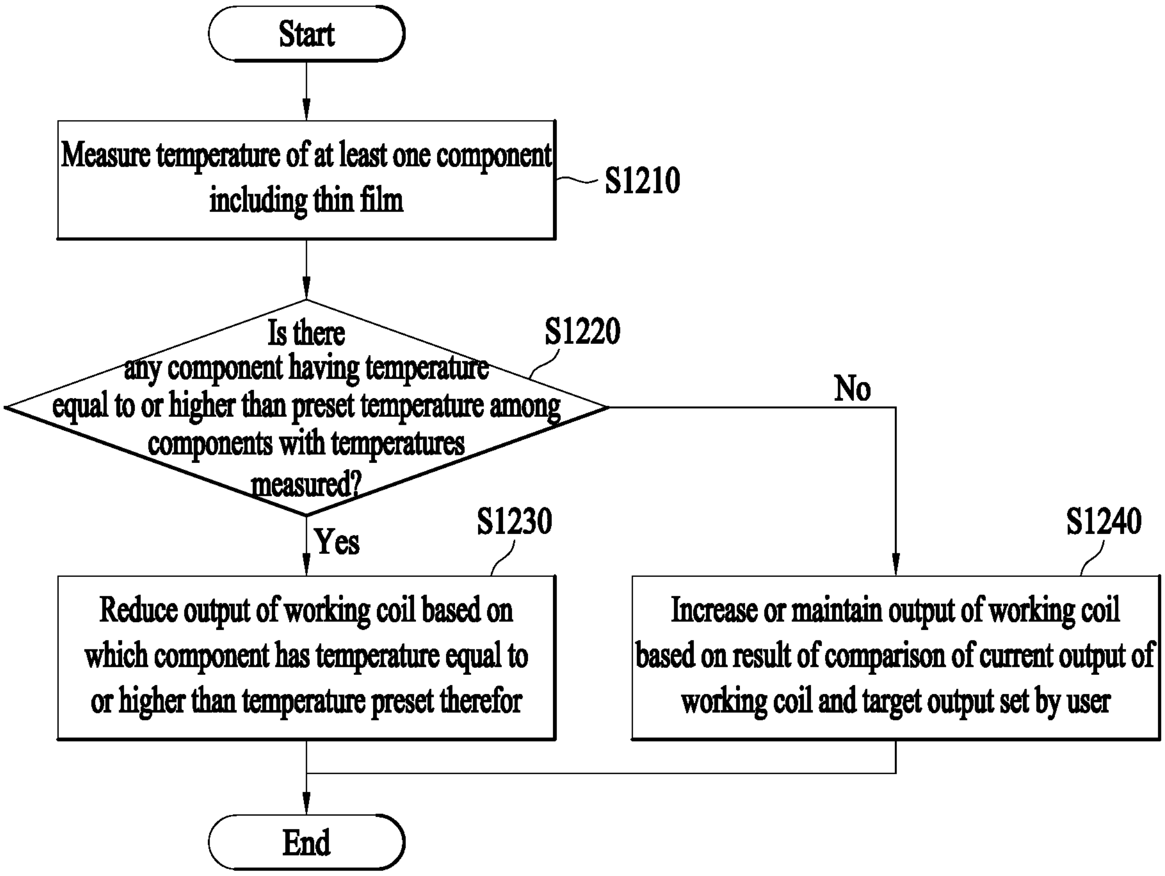
FIG. 12 is a flowchart illustrating an example of a method for controlling an output depending on whether there is a component with a temperature equal to or higher than a preset temperature among components with temperatures measured.

FIG. 12 is a flowchart illustrating an example of a method for controlling an output depending on whether there is a component with a temperature equal to or higher than a preset temperature among components with temperatures measured.

In some implementations, in operation S1210, the cooktop 1000 may measure a temperature of at least one component including the thin film 1020.

In operation S1220, the cooktop 1000 may determine whether there is a component measured to a preset temperature or higher among components of which temperatures are measured.

In some implementations, the MCU 1030 may measure a temperature of each component and determine which temperature section includes a measured temperature of a corresponding component among at least one temperature section set for the corresponding component. In some implementations, the MCU 1030 may control an output of the working coil 1050 by determining which temperature section includes a measured temperature of each component.

In some implementations, when it is determined that a temperature of a component measured by the temperature sensor 1040 is included in one of temperature sections equal to or higher than a predetermined threshold temperature or in one of temperature sections preset for the corresponding component, the MCU 1030 may, in operation 1230, reduce an output of the working coil 1050 based on a result of comparison between the current output of the working coil 1050 and a target output set by a user.

In some implementations, a preset condition is about whether a measured temperature of a component is included one of temperature sections equal to or higher than an arbitrary threshold temperature. How much higher the temperature of the component is compared to the threshold temperature may be determined based on a preset temperature section. Accordingly, the MCU 1030 may determine the degree of reducing the output of the working coil 1050 according to which preset temperature section includes a temperature of a corresponding component among the preset temperature sections equal to or higher than the preset threshold temperature. For example, the higher the temperature section including the temperature of the component is, the higher the degree of reducing the output of the working coil 1050 may be set.

In some implementations, in order to reduce the output of the working coil 1050 based on what a component is, the MCU 1030 may determine whether a temperature of the component satisfies a preset condition (for example, which temperature section including the temperature of the component), and may determine the degree of reducing the output of the working coil 1050 based on the determination. This will be described later through various examples.

In some implementations, when it is determined that the temperature of the component measured by the temperature sensor 1040 corresponds to a temperature section lower than the arbitrary threshold temperature or does not correspond to any of the temperature sections preset for the corresponding component, the MCU 1030 may, in operation S1240, increase or maintain the output of the working coil 1050 based on a result of comparison between the current output of the working coil 1050 and a target output set by the user.

In some implementations, when the target output set by the user is higher than the current output of the working coil 1050, the MCU 1030 may increase the output of the working coil 1050.

In some implementations, when the current output of the working coil 1050 and the target output set by the user are equal, the MCU 1030 may maintain the current output of the working coil 1050.

In some implementations, when the target output set by the user is lower than the current output of the working coil 1050, the MCU 1030 may determine the operation of the working coil 1050 as an abnormal operation and hence block the output of the working coil 1050.

Figure 13:
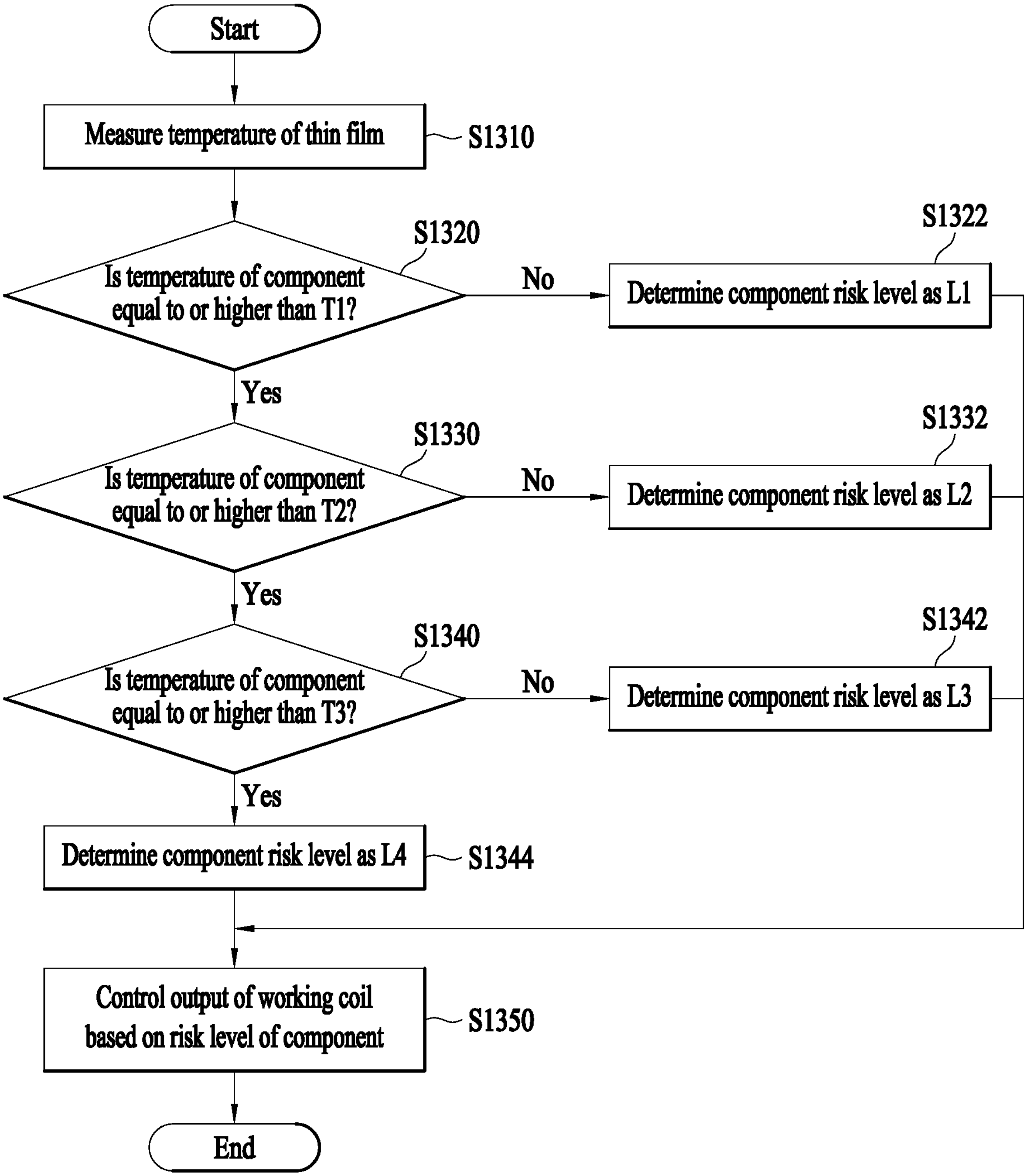
FIG. 13 is a flowchart illustrating an example of a method for controlling an output of a working coil based on a plurality of component risk levels that are determined based on temperatures of the components.

FIG. 13 is a flowchart illustrating an example of a method for controlling an output of the working coil 1050 based on a plurality of component risk levels that are determined based on a temperature of a component.

For example, in operation S1310, the cooktop 1000 may measure a temperature T of at least one component.

In some implementations, based on the temperature measured in operation S1310, the MCU 1030 may determine a risk level of a component whose temperature is measured.

In some implementations, the MCU 1030 may determine whether the temperature of the corresponding component is equal to or higher than T1 in operation S1320. In some implementations, when the temperature of the corresponding component is not equal to or higher than T1 (that is, T<T1), the MCU 1030 may determine the risk level of the corresponding component as L1 in operation S1322.

In some implementations, when the temperature of the corresponding component is equal to or higher than T1, the MCU 1030 may determine whether the temperature of the corresponding component is equal to or higher than T2 in operation S1330. In some implementations, when the temperature of the corresponding component is equal to or higher than T1 but not equal to or higher than T2 (that is, T1≤T<T2), the MCU 1030 may determine the risk level of the corresponding component as L2 in operation S1332.

In some implementations, when the temperature of the corresponding component is equal to or higher than T2, the MCU 1030 may determine whether the temperature of the corresponding component is equal to or higher than T3 in operation S1330. In some implementations, when the temperature of the corresponding component is equal to or higher than T2 but not equal to or higher than T3 (that is, T2≤T<T3), the MCU 1030 may determine the risk level of the corresponding component as L3 in operation S1332.

In some implementations, when the temperature of the corresponding component is equal to or higher than T3 (that is, T3≤T), the MCU 1030 may determine the risk level of the corresponding component as L4 in operation S1334.

However, the temperature sections described as at least one condition preset for each component are not necessarily limited to the above-described examples, and it should be understood that the temperature sections may be implemented in various ranges, numbers, and the like within a range obvious to those skilled in the art.

In some implementations, the MCU 1030 may control the output of the working coil based on the risk level of the corresponding component determined in operation S1322, S1332, or S1342. In some implementations, when the risk level of the corresponding component is L1, the MCU 1030 may maintain the current output of the working coil 1050. In some implementations, when the risk level of the corresponding component is, for example, L2 or L2 which is higher than L1, the MCU 1030 may reduce the output of the working coil 1050 to a degree corresponding to the risk level of the corresponding component. The method in which the MCU 1030 controls the output of the working coil 1050 based on the risk level of the corresponding component may be implemented through various examples described in the present disclosure.

Figure 14:
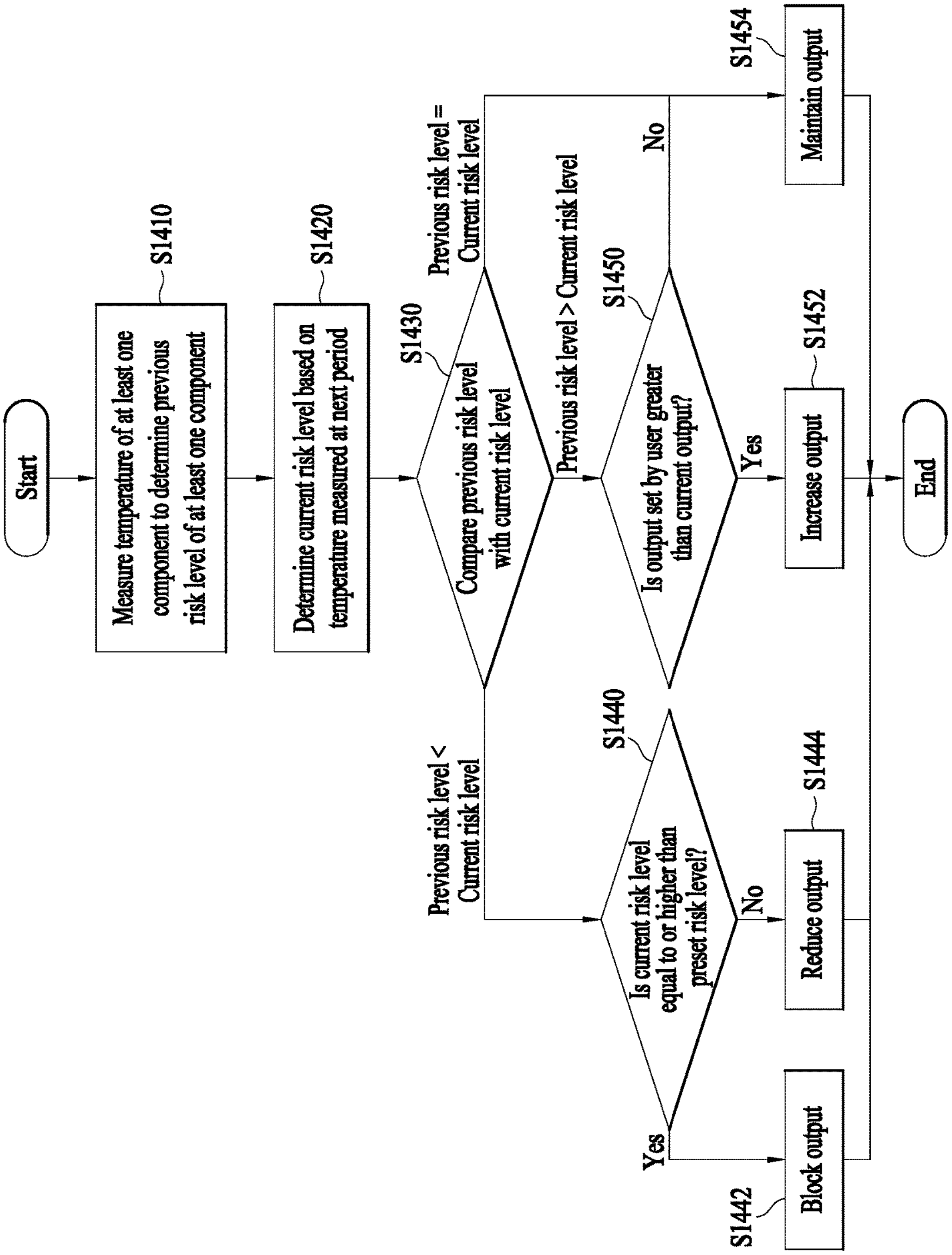
FIG. 14 is a flowchart illustrating an example of a method for controlling an output of the working coil by determining a risk level of a component according to a temperature of the component measured at each period and comparing a risk level measured at a previous period with a risk level measured at a current period.

FIG. 14 is a flowchart illustrating an example of a method for controlling an output of the working coil 1050 by determining a risk level of a component according to a temperature of the component measured at each period and comparing a risk level measured at a previous period with a risk level measured at a current period.

In operation S1410, the cooktop 1000 may measure a temperature of at least one component to determine a risk level of the at least one component. Measuring the temperature of the at least one component and determining the risk level of the at least one component in operation S1410 may be implemented through various examples described above with reference to FIG. 13 and the like.

In some implementations, the cooktop 1000 may determine measure the temperature of the at least one component at each arbitrary period to determine the risk level of the at least one component.

The cooktop 1000 may determine the risk level of the at least one component in operation S1410 and may determine a current risk level of the at least one component based on a temperature measured at the next period in operation S1420. Hereinafter, for convenience of explanation, the risk level determined in operation S1420 will be referred to as a current risk level, and the risk level determined in operation S1410 performed before operation S1420 will be referred to as a previous risk level.

In some implementations, the cooktop 1000 may compare the previous risk level and the current risk level in operation S1430.

In some implementations, the cooktop 1000 may identify whether a risk level of a component increases or decreases over time by comparing the previous risk level with the current risk level.

In some implementations, when it is determined in operation S1430 that the previous risk level is lower than the current risk level, the MCU 1030 may reduce the output of the working coil 1050.

In some implementations, when it is determined that the previous risk level is lower than the current risk level, the cooktop 1000 may determine whether the current risk level is equal to or higher than a preset risk level in operation S1440. In some implementations, when the current risk level is equal to or higher than the preset risk level, the cooktop 1000 may block the output of the working coil 1050 in operation S1442. In some implementations, when the current risk level is lower than the preset risk level, the cooktop 1000 may reduce the output of the working coil 1050 in operation S1444.

In some implementations, when it is determined in operation S1430 that the previous risk level is higher than the current risk level, the cooktop 1000 may determine whether an output set by the user is greater than a current output in operation S1450. That is, if it is determined that the previous risk level is higher than the current risk level, this may mean that the risk level is decreasing over time (that is, the temperature of the component is decreasing), and thus, it may be regarded as a situation in which the MCU 1030 has controlled the working coil 1050 to reduce the output of the working coil 1050. In this case, if the output of the working coil 1050 is reduced to or below the output set by the user and thus a heating process continues to be performed at a temperature far lower than a heating temperature desired by the user, the user may feel uncomfortable in use. In some implementations, for convenience in use, when it is determined that the risk level is decreasing, the cooktop 1000 may control the working coil 1050 so that the output of the working coil 1050 does not fall below the output set by the user.

In some implementations, when it is determined in operation S1450 that the output set by the user is greater than the current output, the cooktop 1000 may increase the output of the working coil 1050 in operation S1452. In some implementations, the degree of increasing the output may be proportional to a difference between the output set by the user and the current output. In doing so, it may be possible to prevent or reduce a sudden increase in the output and maintain the stability of use.

In some implementations, when it is determined that the output set by the user is greater than the current output, the cooktop 1000 may directly modify the output of the working coil 1050 to the output set by the user. In doing so, it is possible to control the output of the working coil 1050 to quickly follow the output set by the user, thereby improving convenience in use.

In some implementations, only when a difference between the output set by the user and the current output falls within in a preset range and it is determined that the output set by the user is greater than the current output, the cooktop 1000 may modify the output of the working coil 1050 to the output set by the user. In doing so, it may be possible to prevent or reduce a sudden increase of the output of the working coil 1050 and control the output of the working coil 1050 to quickly follow the output set by the user, thereby improving the stability and ease of use.

In some implementations, when it is determined in operation S1430 that the previous risk level is equal to the current risk level or when it is determined in operation S1450 that the output set by the user is not greater than the current output, the cooktop 1000 may maintain the current output of the working coil 1050 in operation S1454.

Figure 15:
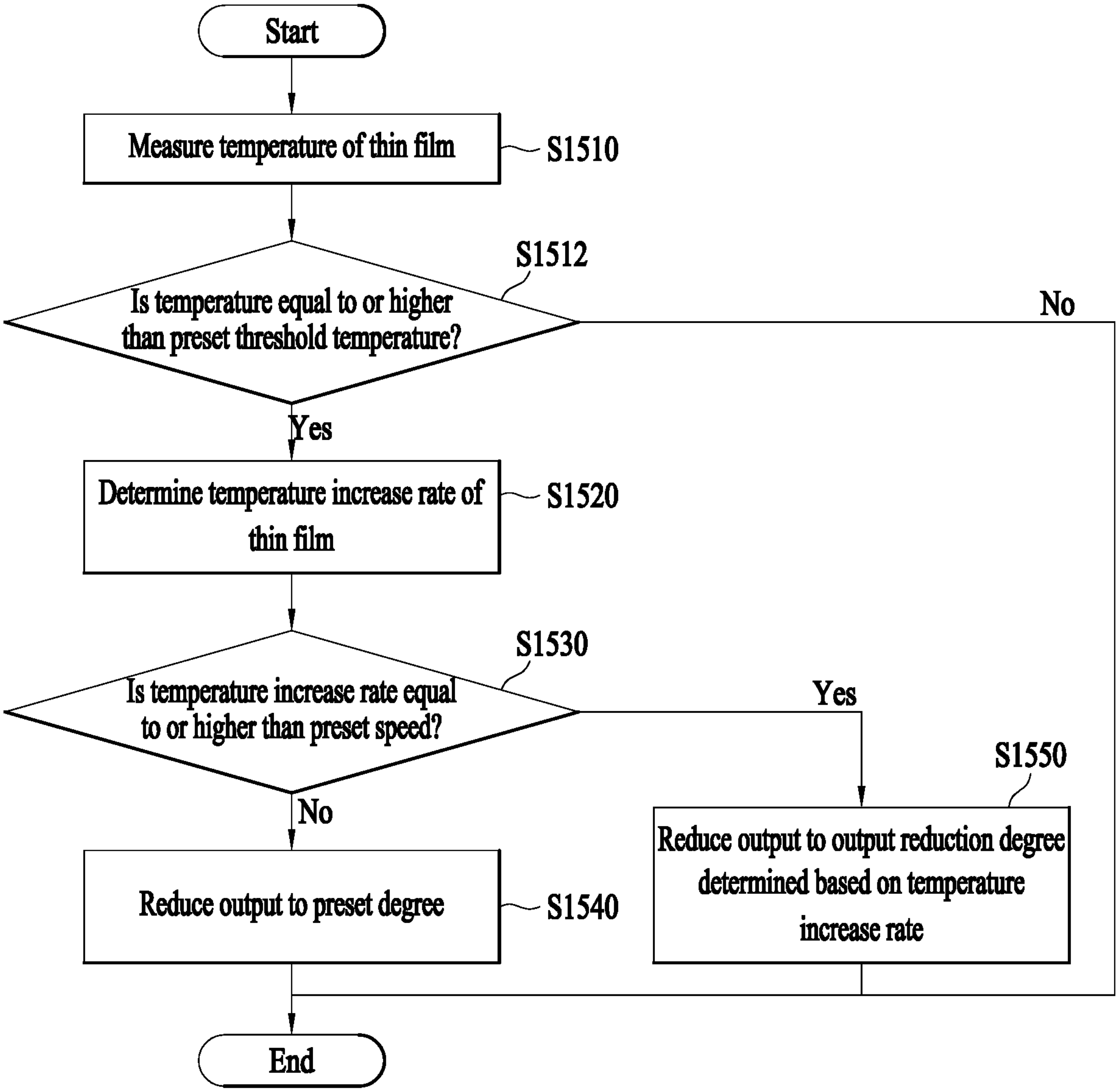
FIG. 15 is a flowchart illustrating an example of a method of determining an output reduction degree by determining a temperature increase rate of a thin film.

FIG. 15 is a flowchart illustrating an example of a method for determining a degree of reducing an output of the working coil 1050 by determining a temperature increase rate of the thin film 1020.

In some implementations, the cooktop 1000 may measure a temperature of the thin film 1020 included in at least one component in operation S1510.

In some implementations, the cooktop 1000 may determine whether the temperature of the thin film 1020 measured in operation S1510 is equal to or higher than a preset threshold temperature in operation S1512. In some implementations, when the temperature of the thin film 1020 is lower than the threshold temperature, the cooktop 1000 may maintain an output of the working coil 1050 to an output set by a user.

In some implementations, the cooktop 1000 may determine a temperature increase rate based on the temperature, measured in operation S1510, in operation S1520. In some implementations, a temperature increase rate of the thin film 1020 may be determined at each predetermined period, and the temperature increase rate may be determined based on a difference between a temperature measured at a previous period and a temperature measured at a current period.

In some implementations, the cooktop 1000 may determine whether the temperature increase rate determined in operation S1520 is equal to or greater than a preset rate in operation S1530.

In some implementations, when it is determined that the temperature increase rate determined in operation S1530 is less than the preset rate, the cooktop 1000 may reduce the output of the working coil 1050 to a preset degree in operation S1540.

In some implementations, the cooktop 1000 may determine which of a plurality of preset rate sections the temperature increase rate determined in operation S1520 is included in. For example, through a process corresponding to the process of determining a risk level of a component based on a measured temperature in FIG. 13, the degree of increasing the temperature increase rate may be determined. In some implementations, the cooktop 1000 may determine that a temperature increase rate V is included in which of a plurality of temperature sections (for example, a first section ($V<V1$), a second section ($V1\leq V<V2$), a third section ($V2\leq V<V3$), and a fourth section ($V3\leq V$).

In some implementations, the cooktop 1000 may determine the degree of reducing the output of the working coil 1050 based on which temperature section includes the temperature increase rate. In some implementations, when the temperature increase rate V is included in the first section ($V<V1$), the cooktop 1000 may determine an output reduction degree as D1. In some implementations, using N rate sections where a temperature increase rate may be determined, the cooktop 1000 may determine the output reduction degree as Dn when the temperature increase rate is included in the N sections (Vn≤V<Vn+1).

For example, when the temperature increase rate V is included in the second section (V1≤V<V2), the cooktop 1000 may determine the output reduction degree as D2. In another example, when the temperature increase rate V is included in the third section (V2≤V<V3), the cooktop 1000 may determine the output reduction degree as D3. In some implementations, as the temperature increase rate increases, the output reduction degree may increase. That is, the cooktop 1000 may further reduce the output of the working coil 1050 when the output reduction degree is Dn rather than Dn−1.

In some implementations, when the temperature increase rate is included in the first section, the cooktop 1000 may reduce the output of the working coil 1050 to a predetermined degree (for example, D1).

In some implementations, when it is determined that the temperature increase rate determined in operation S1530 is equal to or greater than a preset rate, the cooktop 1000 may determine an output reduction degree based on the temperature increase rate and may reduce the output of the working coil 1050 to the determined output reduction degree in operation S1550. In some implementations, the greater the difference between the preset rate and the temperature increase rate is, the further the cooktop 1000 may reduce the output of the working coil 1050. That is, the cooktop 1000 may determine an output reduction degree by determining which of the plurality of preset rate sections includes the temperature increase rate, and may reduce the output of the working coil 1050 to the determined output reduction degree.

In some implementations, when it is determined that the temperature increase rate determined in operation S1530 is less than a preset rate, the cooktop 1000 may reduce the output of the working coil 1050 to the preset output reduction degree in operation S1540.

As described above, the cooktop 1000 may reduce the output of the working coil 1050 adaptively to the temperature increase rate by determining whether the temperature increases rapidly at a rate above the preset rate.

Figure 16A:
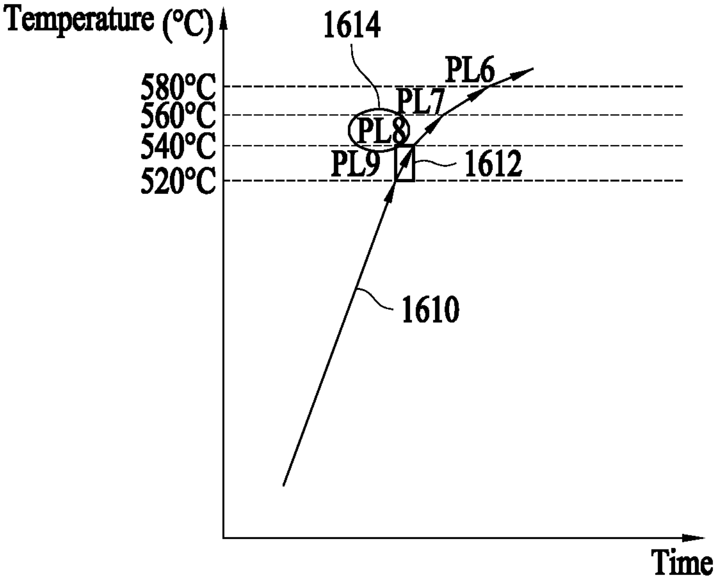
FIGS. 16A and 16B are diagrams illustrating examples of an output reduction degree determined according to a temperature increase rate of a thin film.
Figure 16B:
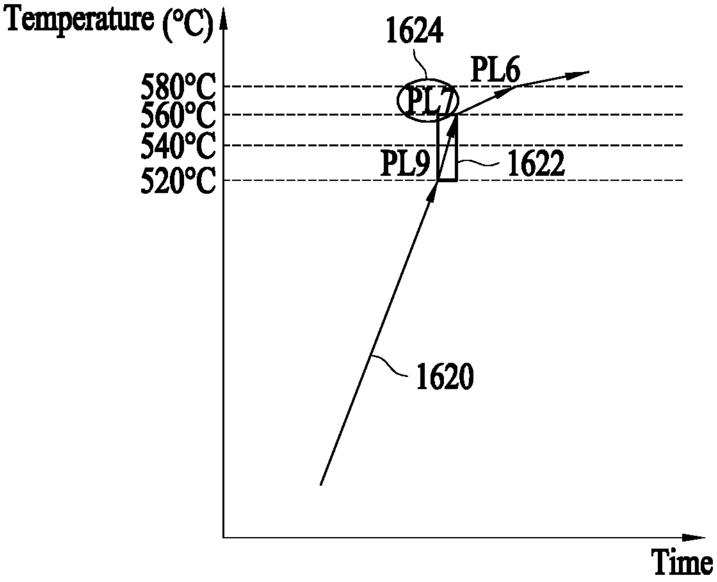

FIGS. 16A and 16B are diagrams showing examples of an output reduction degree determined based on a temperature increase rate of the thin film 1020.

Referring to FIGS. 16A and 16B, when a temperature of the thin film 1020 is lower than a preset threshold temperature (for example, 520° C.) as indicated by reference numerals 1610 and 1620, the cooktop 1000 may maintain the output of the working coil 1050 to an output set by a user.

In some implementations, even if the thin film 1020 is heated by the output of the same working coil 1050, the temperature may increase at a higher rate depending on a state of the cooktop 1000 (for example, when an object placed at the upper plate 1010 is empty or the like). In some implementations, when the temperature of the thin film 1020 is determined to be equal to or higher than the preset threshold temperature, the cooktop 1000 may determine a temperature increase rate and may determine whether the temperature increase rate is lower than a preset rate (or whether the temperature increase rate is included in the first section).

In some implementations, when the temperature increase rate is less than the preset rate, the cooktop 1000 may reduce the output of the working coil 1050 to a preset degree (for example, D1). Referring to FIG. 16A, in some implementations, as a temperature increase rate 1612 is included in the first section, the output of the working coil 1050 is reduced to the degree D1 and thereby lowered by one step from PL9 to PL8.

Referring to FIG. 16B, in some implementations, as a temperature increase rate 1622 is included in the second section, the output of the working coil 1050 is reduced to a degree D2 and thus lowered by two steps from PL9 to PL7. That is, as the output reduction degree of the working coil 1050 increases in proportion to the temperature increase rate, the output of the working coil 1050 may be relatively more rapidly reduced in FIG. 16B, where the temperature increases rapidly. Accordingly, if the temperature increase rate is higher, the cooktop 1000 may further reduce the output of the working coil 1050 to reduce the temperature increase rate, thereby securing stability of use of the cooktop 1000.

Figure 17:
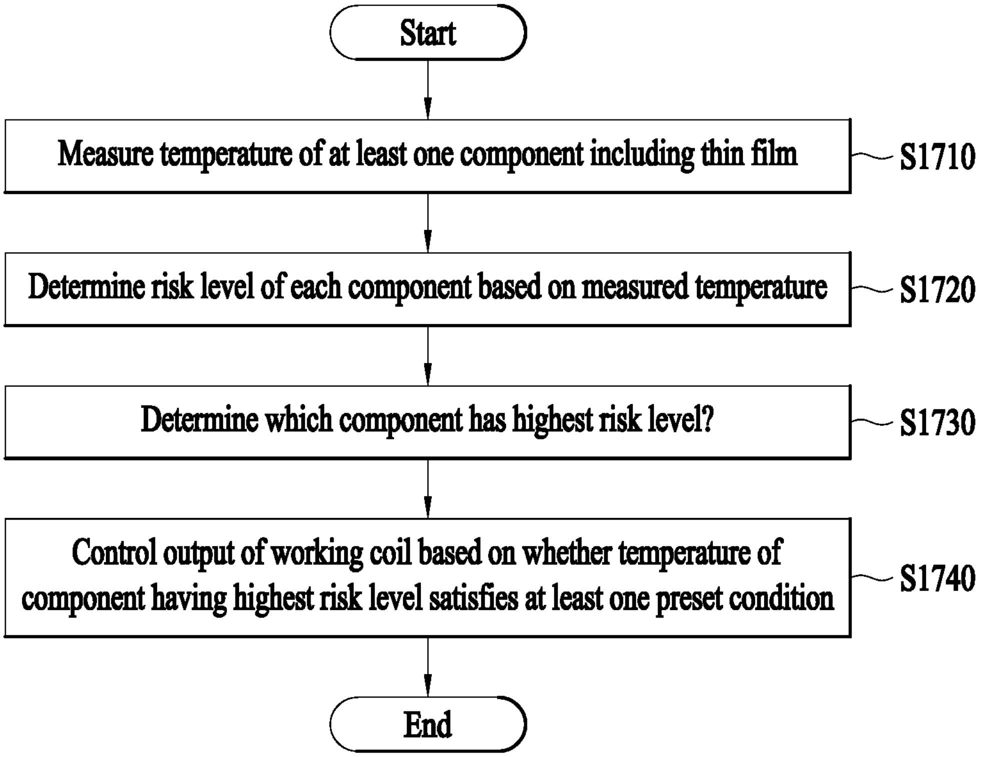
FIG. 17 is a flowchart illustrating an example of a method for controlling an output of a working coil based on a temperature of a component having the highest risk level among components of a cooktop.

FIG. 17 is a flowchart illustrating an example of a method for controlling an output of the working coil 1050 based on a temperature of a component having the highest risk level among components of the cooktop 1000.

In some implementations, the cooktop 1000 may, in operation S1710, measure a temperature of at least one component including a thin film by using the temperature sensor 1040.

In some implementations, the cooktop 1000 may, in operation S1720, determine a component risk level of each component based on the temperature measured in operation S1710. In some implementations, the process in which the cooktop 1000 determines the component risk level may be implemented through various examples described above including FIG. 13.

In some implementations, the cooktop 1000 may, in operation S1730, determine which component has the highest component risk level among component risk levels determined in operation S1720.

In some implementations, the cooktop 1000 may, in operation S1740, control the output of the working coil 1050 based on whether the temperature of the component determined to have the highest component risk level in operation S1730 satisfies at least one preset condition.

In some implementations, the process of controlling the output of the working coil 1050 based on whether the temperature of the component satisfies the at least one preset condition in operation S1740 may be implemented through various examples described above, and thus, a detailed description thereof is omitted.

In some implementations, at least one component included in the cooktop 1000 may be divided into a first component group and a second component group. In some implementations, the second component group may include the thin film 1020. In some implementations, the cooktop 1000 may combine the various examples described above based on temperature measurements of the first component group and the second component group. In some implementations, at least one component whose temperature is to be measured by the temperature sensor 1040 in the cooktop 1000 may include not only the thin film 1020, but also the upper plate 1010, an insulated gate bipolar transistor (IGBT), and the like. Alternatively, the first component group may include the thin film 1020, and the second component group may include the upper plate 1010 and the IGBT.

For example, in the case of the first component group, the cooktop 1000 may control the output of the working coil 1050 according to a component risk level determined based on a measured temperature for the first component group, whereas, in the case of the second component group, the cooktop 1000 may control the output of the working coil 1050 based on a component risk level and a temperature increase rate. The method for controlling the output of the working coil 1050 based on a temperature of each component included in the first component group and the second component group may be implemented in various combinations as well as the combinations described above.

In some implementations, the cooktop 1000 controls a method of controlling the output of the working coil 1050 according to which of the first component group or the second component group includes a component having the highest component risk level.

In some implementations, various examples included in the present disclosure may be applied to each individual component whose temperature is measured by the temperature sensor 1040 among components of the cooktop 1000.

In some implementations, the cooktop 1000 may control the output of the working coil 1050 based on a result of comparison of at least one output reduction degree that is determined for each at least one component based on a temperature of a corresponding at least one component. In some implementations, the cooktop 1000 may determine an output reduction degree corresponding to a component risk level for each component, and the output reduction degree may be different for each component. Therefore, even if components are at the same risk level, the output reduction degree may be different for each component. In some implementations, the cooktop 1000 may reduce the output of the working coil 1050 to a degree where the output of the working coil 1050 is reduced most greatly among output reduction degrees corresponding to component risk levels determined for the respective components.

In some implementations, when the component having the highest component risk level is determined in operation S1730, the cooktop 1000 may control the output of the working coil 1050 based on a result of a comparison between a current risk level and a previous risk level. The current risk level may be determined based on a temperature measured at a next period, and the previous risk level may be determined based on a temperature measured at a previous period (that is, during the operation S1720). In some implementations, a method in which the cooktop 1000 controls the output of the working coil 1050 by comparing the previous risk level and the current risk level may be implemented through the example described above with reference to FIG. 14, and thus, a detailed description thereof is omitted.

In some implementations, it may be possible to heat an object made of various materials, thereby securing the efficiency and ease of use.

In some implementations, when a thin film is induction heated to a high temperature, it may be possible to control an output of a cooktop according to a measured temperature of any of various components, thereby securing stability of use.

In some implementations, it may be possible to perform temperature control adaptively to various components.

In some implementations, it is possible to control an output of a working coil based on a risk level of a thin film by considering a temperature increase rate of a thin film having a large temperature fluctuation.

While the present disclosure has been described with respect to the specific implementations, it will be apparent to those skilled in the art that various changes and modifications may be made without departing from the spirit and scope of the disclosure as defined in the following claims.

What is claimed is:

1. An induction heating type cooktop, comprising:

a case;

an upper plate coupled to a top of the case and configured to receive an object;

a working coil disposed inside the case and configured to heat the object;

a thin film arranged at at least one of a top surface of the upper plate or a bottom surface of the upper plate;

at least one temperature sensor configured to measure a temperature of at least one of components of the induction heating type cooktop, the components including a first component group including the thin film and a second component group including one or more of the components; and a microcontroller unit (MCU) configured to:

determine a current temperature or a temperature increase rate of the second component group, and control an output of the working coil based on the current temperature or the temperature increase rate of at least one component of the second component group.

2. The induction heating type cooktop of claim 1, wherein the at least one temperature sensor comprises a thermocouple configured to measure a temperature of the thin film.

3. The induction heating type cooktop of claim 1, wherein the at least one temperature sensor is configured to measure a first temperature of at least one component of the first component group and a second temperature of at least one component of the second component group, the second component group including at least one of the working coil, the upper plate, or an insulated gate bipolar transistor (IGBT).

4. The induction heating type cooktop of claim 1, wherein the MCU configured to:

determine whether there is a component with a temperature equal to or higher than a preset temperature among the components of the second component group, control the output based on whether there is the component with the temperature equal to or higher than the preset temperature among the components of the second component group with temperatures measured.

5. The induction heating type cooktop of claim 4, wherein the MCU is configured to control the output of the working coil based on which component has the temperature equal to or higher than the preset temperature.

6. The induction heating type cooktop of claim 1, wherein the MCU is configured to:

measure a temperature of each component of the first component group and the second component group, and determine which temperature section includes a measured temperature of a corresponding component among at least one temperature section set for the corresponding component.

7. The induction heating type cooktop of claim 6, wherein the MCU is configured to control the output of the working coil by determining which temperature section includes a measured temperature of each component.

8. The induction heating type cooktop of claim 1, wherein the MCU is configured to:

determine a risk level based on the current temperature of the second component group, and control the output of the working coil based on the risk level.

9. The induction heating type cooktop of claim 8, wherein the MCU is configured to determine the risk level based on whether the current temperature of the second component group is within which one of a plurality of preset temperature ranges.

10. The induction heating type cooktop of claim 1, wherein the MCU is configured to measure the temperature of the at least one component at each arbitrary period.

11. The induction heating type cooktop of claim 1, wherein the MCU is configured to:

measure (i) a first temperature of at least one component of the second component group at a first period and (ii) a second temperature of at least one component of the second component group at a second period, the second period defined as a current period and being next period of the first period, compare the first temperature and the second temperature, and control the output of the working coil based on comparing the first temperature and the second temperature.

12. The induction heating type cooktop of claim 1, wherein a degree of increasing the output of the working coil is proportional to a difference between an output set by a user and a current output of the working coil.

13. The induction heating type cooktop of claim 1, wherein the MCU is configured to:

determine a risk level of each component based on the temperature of each component measured by the temperature sensor, determine which component has the highest risk level among risk levels determined by the microcontroller unit, and control the output of the working coil based on determining which component has the highest risk level.

14. The induction heating type cooktop of claim 13, wherein the MCU is configured to control the output of the working coil based on whether a temperature of the component determined to have the highest risk level satisfies at least one preset condition.

15. An induction heating type cooktop, comprising:

a case;

an upper plate coupled to a top of the case and configured to receive an object;

a thin film arranged at at least one of a top surface of the upper plate or a bottom surface of the upper plate;

a working coil disposed inside the case and configured to inductively heat the object or the thin film;

at least one of temperature sensor configured to measure a temperature of at least one of components of the induction heating type cooktop, the components including the thin film; and a microcontroller unit (MCU) configured to control an output of the working coil based on the temperature of the component, wherein the temperature sensor is configured to measure a first temperature of the component of a first period and a second temperature of the component of a second period, the second period being a next period of the first period, and wherein the MCU is configured to control the output of the working coil based on the first temperature and the second temperature.

16. A method for controlling an induction heating type cooktop including a case, an upper plate coupled to a top of the case and configured to receive an object, a working coil disposed inside the case and configured to heat the object, a thin film arranged at least one of a top surface of the upper plate or a bottom surface of the upper plate, at least one temperature sensor, and a microcontroller unit (MCU) configured to control the working coil, the method comprising:

measuring a temperature of at least one of components of the induction heating type cooktop, the components including (i) a first component group including the thin film and (ii) a second component group including one or more of the components;

controlling an output of the working coil based on the temperature of at least one of the components, wherein measuring the temperature comprises measuring a temperature of the second component group, wherein the method further comprises determining a current temperature or a temperature increase rate of the second component group, and wherein controlling the output of the working coil comprises controlling the output of the working coil based on the current temperature or the temperature increase rate of at least one component of the second component group.

17. The method according to claim 16, further comprising determining whether there is a component with a temperature equal to or higher than a preset temperature among the components of the second component group, wherein controlling the output of the working coil comprises controlling the output based on which component has the temperature equal to or higher than the preset temperature.

18. The method according to claim 16, wherein controlling the output of the working coil comprises controlling the output based on where the current temperature is within one of a plurality of preset temperature ranges.

19. The method according to claim 16, wherein measuring the temperature comprises (i) a first temperature of at least one component of the second component group at a first period and (ii) a second temperature of at least one component of the second component group at a second period, the second period defined as a current period and being next period of the first period, wherein the method further comprises comparing the first temperature and the second temperature, and wherein controlling the output of the working coil comprises controlling the output of the working coil based on comparing the first temperature and the second temperature.

20. The method according to claim 16, further comprising:

determining a risk level based on the current temperature of at least one component of the second component group, determining which component has the highest risk level among the risk level determined based on the current temperature of at least one component of the second component group, wherein controlling the output of the working coil comprises controlling the output based on whether a temperature of the component having the highest risk level satisfies at least one preset condition.

* * * * *